(12) United States Patent
Takashima et al.

(10) Patent No.: US 9,750,032 B2
(45) Date of Patent: Aug. 29, 2017

(54) BASE STATION DEVICE, WIRELESS COMMUNICATION SYSTEM, AND BASE STATION DEVICE CONTROL METHOD

(71) Applicant: FUJITSU LIMITED, Kawasaki-shi, Kanagawa (JP)

(72) Inventors: Hiroaki Takashima, Kawasaki (JP); Syuuichi Okada, Kawasaki (JP); Seiji Hamada, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 98 days.

(21) Appl. No.: 14/849,191

(22) Filed: Sep. 9, 2015

(65) Prior Publication Data
US 2016/0100393 A1    Apr. 7, 2016

(30) Foreign Application Priority Data

Oct. 2, 2014    (JP) ................ 2014-204265

(51) Int. Cl.
| | |
|---|---|
| H04W 72/04 | (2009.01) |
| H04W 52/02 | (2009.01) |
| H04W 28/06 | (2009.01) |
| H04W 72/12 | (2009.01) |
| H04W 88/08 | (2009.01) |
| H04W 76/02 | (2009.01) |
| H04W 76/06 | (2009.01) |

(52) U.S. Cl.
CPC ..... *H04W 72/048* (2013.01); *H04W 52/0216* (2013.01); *H04W 52/0254* (2013.01); *H04W 28/06* (2013.01); *H04W 72/12* (2013.01); *H04W 76/025* (2013.01); *H04W 76/064* (2013.01); *H04W 88/08* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,507,567 B1 | 1/2003 | Willars | |
| 2011/0051687 A1 | 3/2011 | Nakasato | |
| 2012/0083288 A1* | 4/2012 | Siomina | H04W 64/00 455/456.1 |

(Continued)

FOREIGN PATENT DOCUMENTS

| | | |
|---|---|---|
| JP | 2002-27522 | 1/2002 |
| JP | 2002-542687 | 12/2002 |

(Continued)

*Primary Examiner* — Brian Roberts
(74) *Attorney, Agent, or Firm* — Fujitsu Patent Center

(57) ABSTRACT

A P cell communication unit and an S cell communication unit establish communication with a mobile station using a plurality of radio resources of a first cell and a second cell overlapping the first cell. A moving speed measuring unit measures a moving speed of the mobile station based on a signal transmitted from the mobile station using the radio resources of the first cell. A scheduling processing unit stops an allocation of the radio resources of the second cell to the mobile station based on a wireless environment with the mobile station. The scheduling processing unit starts an allocation of the radio resources of the second cell to the mobile station when the moving speed of the mobile station is less than a certain value in a state in which the allocation of the radio resources of the second cell is stopped.

13 Claims, 17 Drawing Sheets

(56) References Cited

U.S. PATENT DOCUMENTS

| | | | | |
|---|---|---|---|---|
| 2012/0252432 A1* | 10/2012 | Henttonen | ............ | H04W 24/10 |
| | | | | 455/422.1 |
| 2013/0084849 A1* | 4/2013 | Koskinen | .......... | H04W 36/0088 |
| | | | | 455/422.1 |
| 2013/0084884 A1* | 4/2013 | Teyeb | ................... | H04W 48/04 |
| | | | | 455/456.1 |
| 2014/0274095 A1* | 9/2014 | Saito | ..................... | H04W 48/16 |
| | | | | 455/452.1 |

FOREIGN PATENT DOCUMENTS

| | | |
|---|---|---|
| JP | 2009-182413 | 8/2009 |
| JP | 2012-209649 | 10/2012 |
| JP | 2013-70159 | 4/2013 |
| WO | 00/62572 | 10/2000 |

\* cited by examiner

BASE STATION DEVICE, WIRELESS COMMUNICATION SYSTEM, AND BASE STATION DEVICE CONTROL METHOD

CROSS-REFERENCE TO RELATED APPLICATION

This application is based upon and claims the benefit of priority of the prior Japanese Patent Application No. 2014-204265, filed on Oct. 2, 2014, the entire contents of which are incorporated herein by reference.

FIELD

The present invention relates to a base station device, a wireless communication system, and a base station device control method.

BACKGROUND

In recent years, a wireless communication system with a carrier aggregation (CA) function in which a plurality of frequency bands are simultaneously operated as one communication line to transmit and receive data in a distributed manner for higher-speed data communication has been proposed.

In the wireless communication system with the CA function, a wireless base station establishes communication with a plurality of mobile stations. Further, the wireless base station is connected with a core network and other wireless base stations through a wired transmission path called an S1 interface or an X2 interface.

When the CA function is implemented, cells of a plurality of frequency bands overlap in the same area. A plurality of frequency bands used in the wireless communication system having the CA function are called component carriers. The component carriers are classified into a primary component carrier (PCC) serving as a main carrier and a secondary component carrier (SCC). A cell allocated as the primary component carrier is referred to as a main cell or a primary cell (P cell). A cell allocated as the secondary component carrier is referred to as a sub cell or a secondary cell (S cell).

A Physical Downlink Shared Chanel (PUSCH), a Physical Uplink Control Chanel (PUCCH), and a Sounding Reference Signal (SRS) are transmitted from a mobile station to the P cell side of the wireless base station, and the PUSCH and the SRS are transmitted from the mobile station to the S cell side. Here, the reason why the PUCCH is not transmitted to the S cell side is as follows. In other words, it is consequential to reduce a peak to average power ratio (PAPR) depending on a terminal. To this end, it is desirable to transmit data through consecutive bands. However, when the CA is performed, if the PUCCH is transmitted through a separate component carrier, data is likely to be transmitted through non-consecutive bands. In order to prevent this, when the CA is performed, the wireless base station transmits the PUCCH only to the P cell side.

The wireless base station accommodates a plurality of mobile stations within a communication coverage. For this reason, in order to establish communication with the mobile station, the wireless base station performs a process of selecting a mobile station of a communication target from a plurality of mobile stations, and then establishes communication with the selected mobile station. The selecting of the mobile station is also referred to as a scheduling process, and examples of the method include a maximum carrier-to-interference power ratio (CIR) technique or a proportional fairness (PF) technique. The mobile station selected by the scheduling process selects available uplink radio resources among radio resources of the P cell and the S cell, and establishes communication with the wireless base station.

Here, when the mobile station is moving at a high speed, a frequency of an uplink signal received by the wireless base station varies due to the Doppler shift (the Doppler effect). For example, when the mobile station is moving in a bullet train (Shinkansen), a frequency variation modeled in 3GPP TS36.104 Annex B.4 High Speed train condition appears.

As a method of improving reception characteristics in circumstances in which the mobile station is moving at a high speed as described above, for example, the use of a PUCCH format 2 is disclosed in 3GPP TS36.104 8.2.3 Requirements for high speed train. Since the mobile station transmits the PUCCH format 2 in order to notify of a channel quality indicator (CQI), the wireless base station can improve the reception characteristics by measuring a frequency variation using the signal and using a measurement result for signal reception.

Uplink communication data is transmitted through the PUSCH, but the mobile station uses the PUSCH only when there is communication data. For this reason, the PUSCH is not regularly transmitted from the mobile station. When the PUSCH is received, the frequency variation can be measured using the pilot signal included in the PUSCH, but frequency variation measurement accuracy is not enough since the number of samples for the measurement is small. For this reason, although the frequency variation is measured using the PUSCH, it is difficult to expect an improvement in the reception characteristics. Thus, the PUCCH format 2 regularly transmitted from the mobile station is often used for measurement of the frequency variation.

Here, when the S cell side establishes communication using the CA function, the PUCCH format 2 is not transmitted from the mobile station to the wireless base station. For this reason, it is difficult to secure desired reception characteristics in a state in which the mobile station is moving at a high speed. When the reception characteristics have deteriorated, in the wireless base station, the number of reception NG determinations of the PUSCH is increased, and the number of transmission processes increases accordingly. As a result, the throughput of the entire wireless communication system is decreased.

When the throughput is decreased, for example, it is considered to detect an increase in the number of reception NG determinations of the PUSCH and perform scheduling control in which radio resources of the S cell are not allocated to the detected mobile station.

Further, the following techniques have been proposed as a wireless communication system of a related art. First, there is a related art in which it is determined whether or not a handover is performed according to a speed of a mobile station when a cell of a moving destination candidate is more excellent in a communication quality than a cell of a moving source. Further, there is a related art in which execution of the handover is decided according to a moving speed while changing a parameter according to a type of communication. Further, there is a related art in which a cell to be preferentially selected, from a large-diameter cell and a small-diameter cell arranged to overlap, is decided according to a moving speed. Further, there is a related art in which, when there are a frequency band and an extension frequency band of a cell, allocation of radio resources is changed at a timing at which the extension frequency band becomes effective. Further, there is a related art in which, when some channels being used for communication between the wireless base station and the mobile station are not used for communication, the resources are used for a connection with another mobile station.

Patent Literature 1: Japanese Laid-open Patent Publication No. 2013-70159

Patent Literature 2: Japanese Laid-open Patent Publication No. 2009-182413

Patent Literature 3: Japanese Laid-open Patent Publication No. 2002-27522

Patent Literature 4: Japanese Laid-open Patent Publication No. 2012-209649

Patent Literature 5: Japanese National Publication of International Patent Application No. 2002-542687

However, when the radio resources of the S cell are not allocated to the mobile station, it is thereafter decided whether or not the allocation of the radio resources of the S cell to the mobile station shall be resumed. For this reason, although the allocation of the radio resources of the S cell is stopped, the wireless base station consistently measures the radio quality of the S cell side. Further, the mobile station consistently transmits the pilot signal such as an SRS of the S cell side. Thus, when the radio resources of the S cell are not allocated to the mobile station, in the related art, an unnecessary process is performed in both the wireless base station and the mobile station. As a result, the wireless base station consistently has a high processing load and thus is likely to consume electric power unnecessarily. On the other hand, when the radio quality measurement is simply stopped in order to reduce the processing load and the power consumption, the allocation of the radio resources is not resumed at an appropriate timing, and thus the radio quality deteriorates.

Further, in the above-mentioned related arts, the return after the allocation of the radio resources of the S cell to the mobile station is stopped is not considered. Thus, although any of the above-mentioned related arts are used, it is difficult to improve the radio quality while suppressing the processing load and the power consumption of the wireless base station.

SUMMARY

According to an aspect of an embodiment, a base station device includes: a communication unit that establishes communication with a wireless terminal device using a plurality of radio resources of a first cell and a second cell overlapping the first cell; a measuring unit that measures a moving speed of the wireless terminal device based on a signal that is transmitted from the wireless terminal device using the radio resources of the first cell; and a control unit that stops an allocation of the radio resources of the second cell to the wireless terminal device based on a wireless environment with the wireless terminal device, and starts an allocation of the radio resources of the second cell to the wireless terminal device when the moving speed of the wireless terminal device is less than a certain value in a state in which the allocation of the radio resources of the second cell is stopped.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of a base station device, a wireless communication system, and a base station device control method disclosed in the present application will be described in detail with reference to the appended drawings. The base station device, the wireless communication system, and the base station device control method disclosed in the present application are not limited to the following embodiments.

First Embodiment

Figure 1:
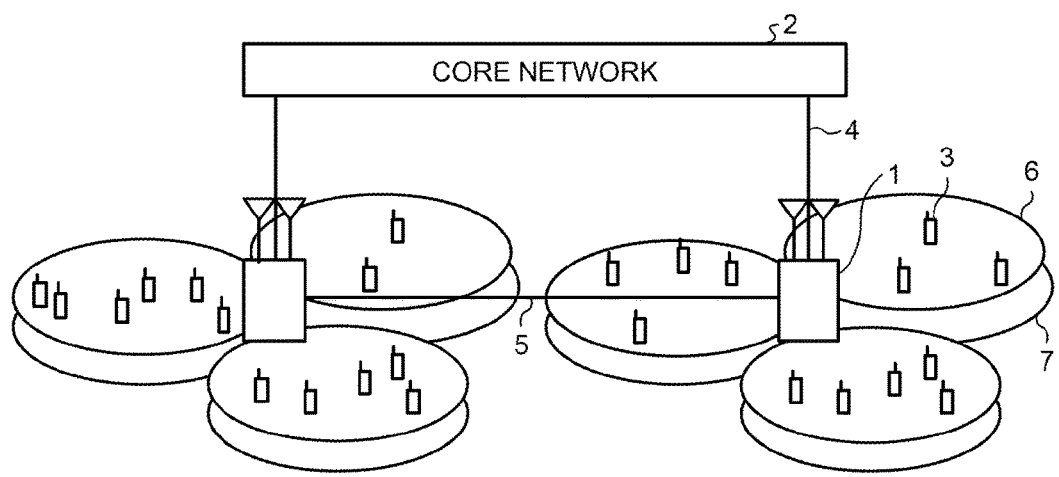
FIG. 1 is a configuration diagram of a wireless communication system having a CA function.

FIG. 1 is a configuration diagram of a wireless communication system having a CA function. A wireless communication system according to the present embodiment includes a wireless base station 1, a core network 2, and a mobile station 3, as illustrated in FIG. 1.

The wireless base station 1 is connected to the core network 2 via an S1 interface 4 serving as a wired transmission path. The wireless base stations 1 are connected with each other via an X2 interface 5 serving as a wired transmission path.

The wireless base station 1 according to the present embodiment has the CA function. For example, the wireless base station 1 establishes communication with the mobile station 3 using a primary component carrier and a secondary component carrier which differ in a channel frequency. A serving cell in which the mobile station 3 establishes communication with the wireless base station 1 using the primary component carrier is a P cell 6. A serving cell in which the mobile station 3 establishes communication with the wireless base station 1 using the secondary component carrier is an S cell 7. The P cell 6 overlaps the S cell 7. As described above, the wireless base station 1 manages the P cell 6 and the S cell 7. The wireless base station 1 provides the mobile station 3 with the CA function using the P cell 6 and the S cell 7. Here, the present embodiment is described in connection with the example in which the channel frequency of the P cell 6 is different from the channel frequency of the S cell 7. However, the channel frequency of the P cell 6 may be either different from or the same as the channel frequency of the S cell 7. The P cell 6 is an example of a "first cell", and the S cell 7 is an example of a "second cell".

The wireless base station 1 accommodates a plurality of mobile stations 3 under the control of the P cell 6 and the S cell 7 managed thereby. In this regard, the wireless base station 1 performs a scheduling process for selecting a mobile station of a communication target from among the plurality of mobile stations 3 accommodated therein, and establishes communication with the selected mobile station 3.

The wireless base station 1 estimates a MIMO channel propagation path using the SRS serving as the pilot signal received from the mobile station 3, and performs radio link control based on an estimation result. Then, the wireless base station 1 establishes communication with the mobile station 3 using a determined parameter.

Further, the wireless base station 1 establishes communication with another wireless base station 1 that differs in a mobility management entity (MME) of a connection destination, via the S1 interface 4 and the core network 2. The wireless base station 1 establishes communication with another wireless base station 1 that is the same in the MME of the connection destination, via the X2 interface 5.

When selected by the scheduling process of the wireless base station 1, the mobile station 3 selects available radio resources from radio resources of the P cell 6 or the S cell 7, and establishes data communication.

Figure 2:
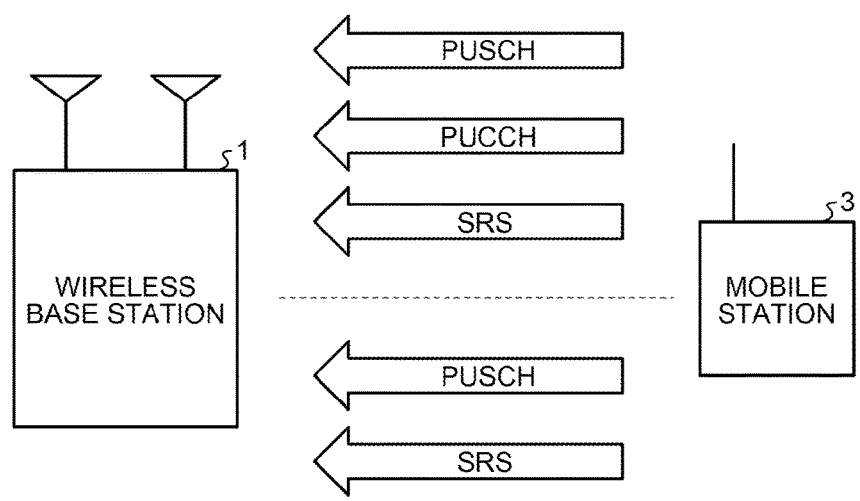
FIG. 2 is a diagram illustrating transmission signals that are transmitted from a mobile station to a wireless base station appropriate for a cell.

FIG. 2 is a diagram illustrating transmission signals that are transmitted from a mobile station to a wireless base station appropriate for a cell. Signals above a dotted line in FIG. 2 are signals that are transmitted from the mobile station 3 at the P cell 6 side to the wireless base station 1. Whereas, Signals below the dotted line are signals that are transmitted from the mobile station 3 at the S cell 7 side to the wireless base station 1. Specifically, at the P cell 6 side, the mobile station 3 transmits the PUSCH, the PUCCH, and the SRS to the wireless base station 1. At the S cell 7, the mobile station 3 transmits the PUSCH and the SRS. The SRS is a signal used for quality measurement.

Figure 3:
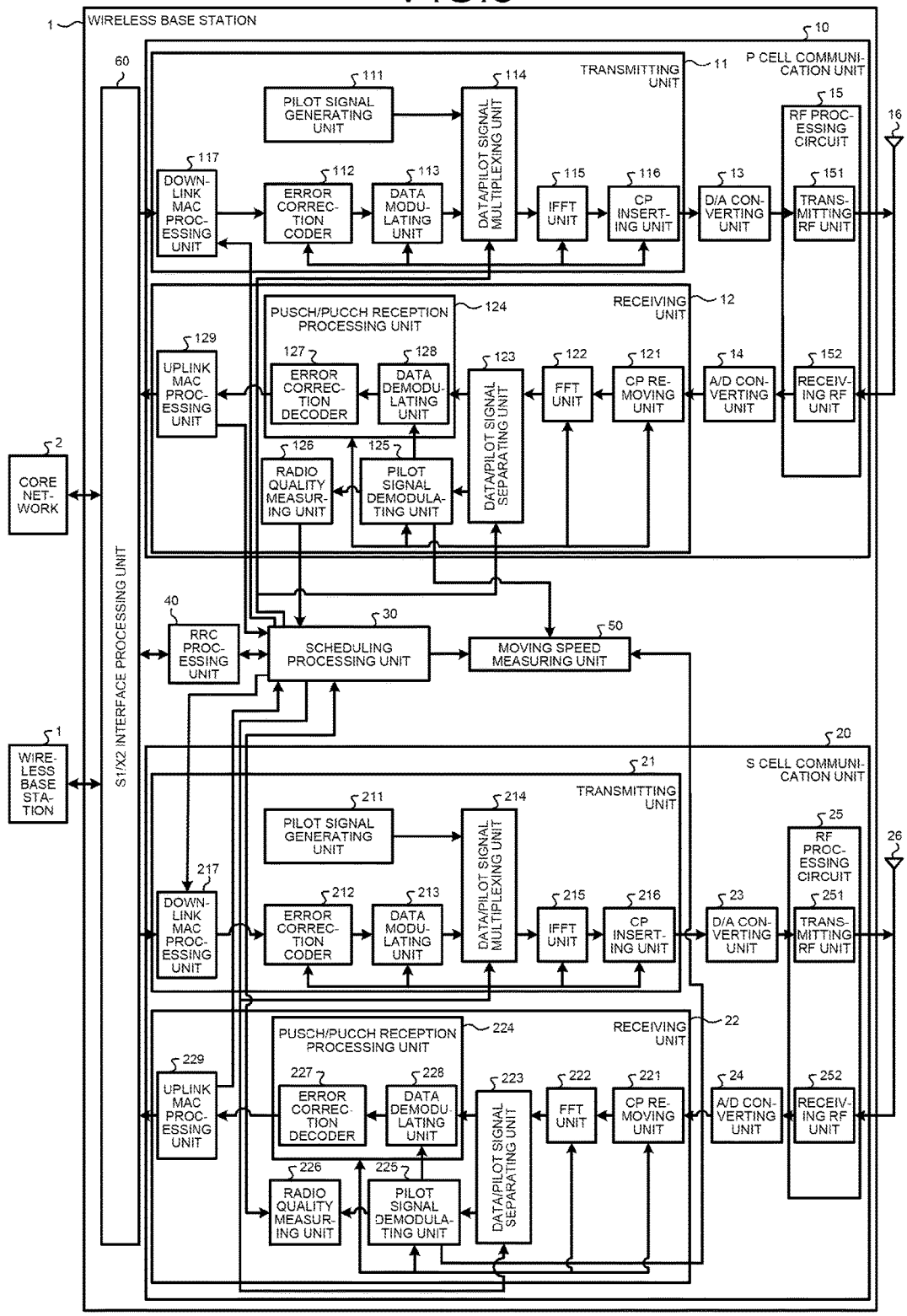
FIG. 3 is a block diagram of a wireless base station according to a first embodiment.

Next, the details of the wireless base station 1 will be described with reference to FIG. 3. FIG. 3 is a block diagram of a wireless base station according to the first embodiment. The wireless base station 1 includes a P cell communication unit 10, an S cell communication unit 20, a scheduling processing unit 30, a radio resource control (RRC) processing unit 40, a moving speed measuring unit 50, and an S1/X2 interface processing unit 60.

The S1/X2 interface processing unit 60 controls communication with the core network 2 and another wireless base station 1 performed via the S1 interface 4 and the X2 interface 5.

For example, the S1/X2 interface processing unit 60 receives a data signal for a downlink signal from the core network 2 via the S1 interface 4. The downlink signal is a signal that is transmitted from the wireless base station 1 to the mobile station 3. Then, the S1/X2 interface processing unit 60 performs various kinds of processes, in a radio link control (RLC) layer and a packet data convergence protocol (PDCP) layer, on the received data signal. Then, the S1/X2 interface processing unit 60 outputs the processed data signal to the P cell communication unit 10 or the S cell communication unit 20 according to a channel frequency to be used. The S1/X2 interface processing unit 60 performs the same operation even on a data signal for a downlink signal received from another wireless base station 1 via the X2 interface 5.

The S1/X2 interface processing unit 60 receives an input of a data signal included in an uplink signal from an uplink MAC processing unit 129 or 229. The uplink signal is a signal that is transmitted from the mobile station 3 to the wireless base station 1. Then, the S1/X2 interface processing unit 60 performs various kinds of processes, in the RLC layer and the PDCP layer, on the received data signal. Then, the S1/X2 interface processing unit 60 transmits the processed data signal to the wireless base station 1 or the core network 2, via the S1 interface 4 or the X2 interface 5.

Further, the S1/X2 interface processing unit 60 receives an RRC message from the RRC processing unit 40. Then, the S1/X2 interface processing unit 60 performs various kinds of processes, in the RLC layer and the PDCP layer, on the RRC message. Then, the S1/X2 interface processing unit 60 outputs the processed RCC message to the P cell communication unit 10 or the S cell communication unit 20, depending on a frequency to be used.

The P cell communication unit 10 includes a transmitting unit 11, a receiving unit 12, a digital/analog (D/A) converting unit 13, an analog/digital (A/D) converting unit 14, and a radio frequency (RF) processing circuit 15. The P cell communication unit 10 is an example of a "communication unit".

The transmitting unit 11 performs a transmission process on a downlink signal. The transmitting unit 11 includes a pilot signal generating unit 111, an error correction coder 112, a data modulating unit 113, a data/pilot signal multiplexing unit 114, an inverse fast Fourier transform (IFFT) unit 115 and a cyclic prefix (CP) inserting unit 116, and an uplink medium access control (MAC) processing unit 117. The respective units of the transmitting unit 11 perform the processes, as follows, based on various kinds of control signals output from the scheduling processing unit 30.

The pilot signal generating unit 111 generates the pilot signal for the downlink signal. Here, the pilot signal is a known signal in the mobile station 3 serving as a receiving station. Then, the pilot signal generating unit 111 outputs the generated pilot signal to the data/pilot signal multiplexing unit 114.

The downlink MAC processing unit 117 receives an input of the data signal from the S1/X2 interface processing unit 60. Then, the downlink MAC processing unit 117 performs a MAC process on the received data signal. Then, the downlink MAC processing unit 117 outputs the data signal that has undergone the MAC process to the error correction coder 112.

Further, when the scheduling processing unit 30 stops the allocation of the radio resources of the S cell, the downlink MAC processing unit 117 receives, from the scheduling processing unit 30, an instruction to transmit an Activation/Deactivation MAC control element (CE) indicating a Deactivation. Upon receiving the instruction, the downlink MAC processing unit 117 outputs the Activation/Deactivation MAC CE indicating the Deactivation to the transmitting unit 11.

Thereafter, when the scheduling processing unit 30 resumes the allocation of the radio resources of the S cell, the downlink MAC processing unit 117 receives an instruction to transmit the Activation/Deactivation MAC CE indicating the Activation from the scheduling processing unit 30. Upon receiving the instruction, the downlink MAC processing unit 117 outputs the Activation/Deactivation MAC CE indicating the Activation to the transmitting unit 11.

The error correction coder 112 receives an input of the data signal for the downlink signal from the downlink MAC processing unit 117. Then, the error correction coder 112 performs error correction coding on the received data signal. Thereafter, the error correction coder 112 outputs the data signal that has undergone the error correction coding process to the data modulating unit 113.

Further, when the scheduling processing unit 30 stops the allocation of the radio resources of the S cell, the error correction coder 112 receives a Deactivation from the downlink MAC processing unit 117. Then, the error correction coder 112 performs the error correction coding on the Deactivation, and outputs the resultant data to the data modulating unit 113.

Thereafter, when the scheduling processing unit 30 resumes the allocation of the radio resources, the error correction coder 112 receives an Activation from the downlink MAC processing unit 117. Then, the error correction coder 112 performs the error correction coding on the Activation, and outputs the resultant data to the data modulating unit 113.

The data modulating unit 113 receives an input of the data signal that has undergone the error correction coding from the error correction coder 112. Then, the data modulating unit 113 performs a data modulation process, such as a quadrature phase shift keying (QPSK) modulation, on the received data signal. Thereafter, the data modulating unit 113 outputs the data signal that has undergone the data modulation process to the data/pilot signal multiplexing unit 114.

Further, when the scheduling processing unit 30 stops the allocation of the radio resources, the data modulating unit 113 receives the Deactivation from the error correction coder 112. Then, the data modulating unit 113 performs the data modulation process on the Deactivation, and outputs the resultant data to the data/pilot signal multiplexing unit 114.

Thereafter, when the scheduling processing unit 30 resumes the allocation of the radio resources, the data modulating unit 113 receives the Activation from the error correction coder 112. Then, the data modulating unit 113 performs the data modulation process on the Activation, and outputs the resultant data to the data/pilot signal multiplexing unit 114.

The data/pilot signal multiplexing unit 114 receives an input of the pilot signal from the pilot signal generating unit 111. Further, the data/pilot signal multiplexing unit 114 receives an input of the data signal that has undergone the data modulation from the data modulating unit 113. Then, the data/pilot signal multiplexing unit 114 performs time multiplexing on the received pilot signal and the data signal to generate the downlink signal. Thereafter, the data/pilot signal multiplexing unit 114 outputs the generated downlink signal to the IFFT unit 115.

On the other hand, when the scheduling processing unit 30 stops the allocation of the radio resources of the S cell, the data/pilot signal multiplexing unit 114 receives the Deactivation from the data modulating unit 113. Then, the data/pilot signal multiplexing unit 114 generates the downlink signal from the Deactivation, and outputs the generated downlink signal to the IFFT unit 115.

Thereafter, when the scheduling processing unit 30 resumes the allocation of the radio resources of the S cell, the data/pilot signal multiplexing unit 114 receives the Activation from a data modulating unit 113. Then, the data/pilot signal multiplexing unit 114 generates the downlink signal from the Activation, and outputs the generated downlink signal to the IFFT unit 115.

The IFFT unit 115 receives an input of the downlink signal from the data/pilot signal multiplexing unit 114. Then, the IFFT unit 115 performs inverse fast Fourier transform on the downlink signal received in units of certain number N of samples, and transforms a signal of the frequency domain into a signal of the time domain. In other words, the IFFT unit 115 regards N data samples of the downlink signal as a sub carrier signal component, and performs the inverse fast Fourier transform on the sub carrier component to transform the sub carrier component into a discrete time signal. Thereafter, the IFFT unit 115 outputs the downlink signal that has undergone the inverse fast Fourier transform to the CP inserting unit 116.

Further, when the scheduling processing unit 30 stops the allocation of the radio resources of the S cell, the IFFT unit 115 receives the downlink signal of the Deactivation from the data/pilot signal multiplexing unit 114. Then, the IFFT unit 115 performs the inverse fast Fourier transform on the downlink signal of the Deactivation, and outputs the transformed result to the CP inserting unit 116.

Thereafter, when the scheduling processing unit 30 resumes the allocation of the radio resources, the IFFT unit 115 receives the downlink signal of the Activation from the data/pilot signal multiplexing unit 114. Then, the IFFT unit 115 performs the inverse fast Fourier transform on the downlink signal of the Activation, and outputs the transformed result to the CP inserting unit 116.

The CP inserting unit 116 receives an input of the downlink signal that has undergone the inverse fast Fourier transform from the IFFT unit 115. Then, the CP inserting unit 116 inserts a CP into the received downlink signal at the head of each of the N samples. Thereafter, the CP inserting unit 116 outputs the downlink signal, into which the CP is inserted, to the D/A converting unit 13. Here, the CPs are copies of M samples (M<N) from the tail among the N samples that have undergone the inverse fast Fourier transform, for example. Since the CPs are cyclically copied, signals are consecutive in a zone of (M+N) samples after the CP insertion. Due to this feature, the communication device such as the wireless base station 1 and the mobile station 3 can remove interference by a delay symbol from an adjacent path using the CPs.

Further, when the scheduling processing unit 30 stops the allocation of the radio resources, the CP inserting unit 116 receives the downlink signal of the Deactivation from the IFFT unit 115. Then, the CP inserting unit 116 inserts the CP into the downlink signal of the Deactivation, and outputs the resultant data to the D/A converting unit 13.

Thereafter, when the scheduling processing unit 30 resumes the allocation of the radio resources, the CP inserting unit 116 receives the downlink signal of the Activation from the IFFT unit 115. Then, the CP inserting unit 116 inserts the CP into the downlink signal of the Activation, and outputs the resultant data to the D/A converting unit 13.

Further, the respective units of the transmitting unit 11 perform the same processes as those performed on the data signal even on the RRC message input from the S1/X2 interface processing unit 60.

The D/A converting unit 13 receives an input of the downlink signal from the CP inserting unit 116. Then, the D/A converting unit 13 converts the received downlink signal from a digital signal into an analog signal. Thereafter, the D/A converting unit 13 outputs the downlink signal converted into the analog signal to a transmitting RF unit 151 of the RF processing circuit 15. The D/A converting unit 13 performs the same process even on the RRC message.

Further, when the scheduling processing unit 30 stops the allocation of the radio resources, the D/A converting unit 13 receives the downlink signal of the Deactivation from the CP inserting unit 116. Then, the D/A converting unit 13 converts the downlink signal of the Deactivation into an analog signal, and outputs the analog signal to the transmitting RF unit 151.

Thereafter, when the scheduling processing unit 30 resumes the allocation of the radio resources, the D/A converting unit 13 receives the downlink signal of the Activation from the CP inserting unit 116. Then, the D/A converting unit 13 converts the downlink signal of the Activation into an analog signal, and outputs the analog signal to the transmitting RF unit 151.

The RF processing circuit 15 includes the transmitting RF unit 151 and a receiving RF unit 152. The transmitting RF unit 151 receives, from the D/A converting unit 13, an input of the downlink signal converted into the analog signal. Then, the transmitting RF unit 151 performs quadrature modulation on the received downlink signal to transform a baseband signal into a radio frequency signal. In other words, the transmitting RF unit 151 performs up-conversion on the downlink signal. Thereafter, the transmitting RF unit 151 transmits the downlink signal transformed into the radio frequency signal to the mobile station 3 through an antenna 16. The RF processing circuit 15 performs the same process even on the RRC message.

Further, when the scheduling processing unit 30 stops the allocation of the radio resources, the RF processing circuit 15 receives the downlink signal of the Deactivation from the D/A converting unit 13. Then, the RF processing circuit 15 converts the downlink signal of the Deactivation into a radio frequency signal, and transmits the radio frequency signal to the mobile station 3.

Thereafter, when the scheduling processing unit 30 resumes the allocation of the radio resources, the RF processing circuit 15 receives the downlink signal of the Activation from the D/A converting unit 13. Then, the RF processing circuit 15 converts the downlink signal of the Activation into a radio frequency signal, and transmits the radio frequency signal to the mobile station 3.

The receiving RF unit 152 receives an uplink signal from the mobile station 3 through the antenna 16. Then, the receiving RF unit 152 converts the received uplink signal from a radio frequency into a baseband signal. In other words, the receiving RF unit 152 performs down-conversion on the uplink signal. Thereafter, the receiving RF unit 152 outputs the uplink signal converted into the baseband signal to the A/D converting unit 14.

The A/D converting unit 14 receives, from the receiving RF unit 152, an input of the uplink signal converted into the baseband signal. Then, the A/D converting unit 14 converts the received uplink signal from an analog signal into a digital signal. Thereafter, the A/D converting unit 14 outputs the uplink signal converted into the digital signal to the receiving unit 12.

The receiving unit 12 includes a CP removing unit 121, a fast Fourier transform (FFT) unit 122, a data/pilot signal separating unit 123, a PUSCH/PUCCH reception processing unit 124, a pilot signal demodulating unit 125, a radio quality measuring unit 126, and the uplink MAC processing unit 129. The respective units of the receiving unit 12 perform the processes, as follows, based on various kinds of control signals output from the scheduling processing unit 30.

The CP removing unit 121 receives, from the A/D converting unit 14, an input of the uplink signal converted into the digital signal. Then, the CP removing unit 121 removes the CP from the received uplink signal. Thereafter, the CP removing unit 121 outputs, to the FFT unit 122, the uplink signal from which the CP has been removed.

The FFT unit 122 receives an input of the uplink signal from the CP removing unit 121. Then, the FFT unit 122 performs the fast Fourier transform on the received uplink signal to transform a signal of the time domain into a signal of the frequency domain. Thereafter, the FFT unit 122 outputs the uplink signal that has undergone the fast Fourier transform to the data/pilot signal separating unit 123.

The data/pilot signal separating unit 123 receives an input of the uplink signal that has undergone the fast Fourier transform from the FFT unit 122. Then, the data/pilot signal separating unit 123 separates the received uplink signal into a data signal and a pilot signal. For example, the SRS is included in the pilot signal. Thereafter, the data/pilot signal separating unit 123 outputs the data signal to a data demodulating unit 128 of the PUSCH/PUCCH reception processing unit 124. The data/pilot signal separating unit 123 outputs the pilot signal to the pilot signal demodulating unit 125.

The PUSCH/PUCCH reception processing unit 124 includes an error correction decoder 127 and the data demodulating unit 128. The data demodulating unit 128 receives an input of the data signal from the data/pilot signal separating unit 123. Further, the data demodulating unit 128 receives an input of the pilot signal included in the uplink signal from the pilot signal demodulating unit 125. Then, the data demodulating unit 128 performs a data demodulation process on the received data signal based on the pilot signal. Thereafter, the data demodulating unit 128 outputs the data signal that has undergone the data demodulation process to the error correction decoder 127.

The error correction decoder 127 receives an input of the data signal that has undergone the data demodulation process from the data demodulating unit 128. Then, the error correction decoder 127 performs error correction decoding on the received data signal. Thereafter, the error correction decoder 127 outputs the data signal that has undergone the error correction decoding process to the uplink MAC processing unit 129.

The pilot signal demodulating unit 125 receives, from the data/pilot signal separating unit 123, an input of the pilot signal transmitted from the mobile station 3. Then, the pilot signal demodulating unit 125 demodulates the received pilot signal. Thereafter, the pilot signal demodulating unit 125 outputs the demodulated pilot signal to the data demodulating unit 128, the radio quality measuring unit 126, and the moving speed measuring unit 50 which will be described later.

The radio quality measuring unit 126 receives, from the data/pilot signal separating unit 123, an input of the pilot signal transmitted from the mobile station 3. Then, the radio quality measuring unit 126 calculates a reception signal level and an interference level from the received pilot signal. Then, the radio quality measuring unit 126 measures a signal to interface ratio (SIR) using the calculated reception signal level and the interference level. The radio quality measuring unit 126 outputs the measured SIR to the scheduling processing unit 30.

The uplink MAC processing unit 129 receives an input of the data signal that has undergone the error correction decoding process from the error correction decoder 127. Then, the uplink MAC processing unit 129 performs the MAC process on the received data signal. Then, the uplink MAC processing unit 129 outputs the data signal that has undergone the MAC process to the S1/X2 interface processing unit 60. Further, the uplink MAC processing unit 129 transmits uplink MAC CE information to the scheduling processing unit 30.

Next, communication of the S cell side will be described. The S cell communication unit 20 includes a transmitting unit 21, a receiving unit 22, a D/A converting unit 23, an A/D converting unit 24, and an RF processing circuit 25. The S cell communication unit 20 is an example of a "communication unit".

The transmitting unit 21 performs the transmission process on the downlink signal. The transmitting unit 21 includes a pilot signal generating unit 211, an error correction coder 212, the data modulating unit 213, a data/pilot signal multiplexing unit 214, an IFFT unit 215, a CP inserting unit 216, and a downlink MAC processing unit 217.

The pilot signal generating unit 211 generates the pilot signal for the downlink signal. Then, the pilot signal generating unit 211 outputs the generated pilot signal to the data/pilot signal multiplexing unit 214.

The downlink MAC processing unit 217 receives an input of the data signal for the downlink signal from the S1/X2 interface processing unit 60. Then, the downlink MAC processing unit 217 performs the MAC process on the received data signal. Then, the downlink MAC processing unit 117 outputs the data signal that has undergone the MAC process to the error correction coder 212.

Further, the downlink MAC processing unit 217 receives the RRC message from the S1/X2 interface processing unit 60. Then, the downlink MAC processing unit 217 performs the MAC process on the RRC message, and outputs the resultant data to the error correction coder 212.

On the other hand, when the scheduling processing unit 30 stops the allocation of the radio resources of the S cell, the downlink MAC processing unit 217 does not perform the MAC process on the data signal since the allocation of the radio resources is stopped.

When the scheduling processing unit 30 performs the allocation of the radio resources of the S cell, the error correction coder 212 receives an input of the data signal that has undergone the MAC process from the downlink MAC processing unit 217. Then, the error correction coder 212 performs the error correction coding on the received data signal according to the control signal received from the scheduling processing unit 30. Thereafter, the error correction coder 212 outputs the data signal that has undergone the error correction coding process to the data modulating unit 213.

On the other hand, when the scheduling processing unit 30 stops the allocation of the radio resources of the S cell, the error correction coder 212 does not perform the error correction coding process on the data signal since the allocation of the radio resources is stopped.

Thereafter, when the scheduling processing unit 30 resumes the allocation of the radio resources of the S cell, the error correction coder 212 resumes the error correction coding process on the data signal according to the control signal received from the scheduling processing unit 30.

When the scheduling processing unit 30 performs the allocation of the radio resources of the S cell, the data modulating unit 213 receives an input of the data signal that has undergone the error correction coding from the error correction coder 212. Then, the data modulating unit 213 performs the data modulation process, such as the QPSK modulation, on the received data signal according to the control signal received from the scheduling processing unit 30. Thereafter, the data modulating unit 213 outputs the data signal that has undergone the data modulation process to the data/pilot signal multiplexing unit 214.

On the other hand, when the scheduling processing unit 30 stops the allocation of the radio resources of the S cell, the data modulating unit 213 does not perform the data modulation process on the data signal since the allocation of the radio resources of the S cell is stopped.

Thereafter, when the scheduling processing unit 30 resumes the allocation of the radio resources of the S cell, the data modulating unit 213 resumes the data modulation process on the data signal according to the control signal received from the scheduling processing unit 30.

The data/pilot signal multiplexing unit 214 receives an input of the pilot signal from the pilot signal generating unit 211. Further, when the scheduling processing unit 30 performs the allocation of the radio resources, the data/pilot signal multiplexing unit 214 receives an input of the data signal that has undergone the data modulation from the data modulating unit 213. Then, the data/pilot signal multiplexing unit 214 performs time multiplexing on the received pilot signal and the data signal according to the control signal received from the scheduling processing unit 30, and generates the downlink signal. Thereafter, the data/pilot signal multiplexing unit 214 outputs the generated downlink signal to the IFFT unit 215.

On the other hand, when the scheduling processing unit 30 stops the allocation of the radio resources of the S cell, the data/pilot signal multiplexing unit 214 does not perform the downlink signal generation process on the data signal since the allocation of the radio resources is stopped.

Thereafter, when the scheduling processing unit 30 resumes the allocation of the radio resources of the S cell, the data/pilot signal multiplexing unit 214 resumes generation of the downlink signal according to the control signal received from the scheduling processing unit 30.

When the scheduling processing unit 30 performs the allocation of the radio resources of the S cell, the IFFT unit 215 receives an input of the downlink signal from the data/pilot signal multiplexing unit 214. Then, the IFFT unit 215 performs the inverse fast Fourier transform on the received downlink signal according to the control signal received from the scheduling processing unit 30 to transform a signal of the frequency domain into a signal of the time domain. Thereafter, the IFFT unit 215 outputs the downlink signal that has undergone the inverse fast Fourier transform to the CP inserting unit 216.

On the other hand, when the scheduling processing unit 30 stops the allocation of the radio resources of the S cell, the IFFT unit 215 does not perform the transform process on the downlink signal since the allocation of the radio resources is stopped.

Thereafter, when the scheduling processing unit 30 resumes the allocation of the radio resources of the S cell, the IFFT unit 215 resumes the inverse fast Fourier transform of the downlink signal according to the control signal received from the scheduling processing unit 30.

When the scheduling processing unit 30 performs the allocation of the radio resources of the S cell, the CP inserting unit 216 receives an input of the downlink signal that has undergone the inverse fast Fourier transform from the IFFT unit 215. Then, the CP inserting unit 216 inserts the CP into the received downlink signal according to the control signal received from the scheduling processing unit 30. Thereafter, the CP inserting unit 216 outputs the downlink signal, into which the CP is inserted, to the D/A converting unit 23.

On the other hand, when the scheduling processing unit 30 stops the allocation of the radio resources of the S cell, the CP inserting unit 216 does not perform the CP insertion process on the downlink signal since the allocation of the radio resources is stopped.

Thereafter, when the scheduling processing unit 30 resumes the allocation of the radio resources of the S cell, the CP inserting unit 216 resumes the insertion of the CP into the downlink signal according to the control signal received from the scheduling processing unit 30.

When the scheduling processing unit 30 performs the allocation of the radio resources of the S cell, the D/A converting unit 23 receives an input of the downlink signal from the CP inserting unit 216. Then, the D/A converting unit 23 converts the received downlink signal from the digital signal into the analog signal according to the control signal received from the scheduling processing unit 30. Thereafter, the D/A converting unit 23 outputs the downlink signal converted into the analog signal to a transmitting RF unit 251 of the RF processing circuit 25.

The RF processing circuit 25 includes the transmitting RF unit 251 and a receiving RF unit 252. When the scheduling processing unit 30 performs the allocation of the radio resources of the S cell, the transmitting RF unit 251 receives, from the D/A converting unit 23, an input of the downlink signal converted into the analog signal. Then, the transmitting RF unit 251 performs the quadrature modulation on the received downlink signal, and converts a baseband signal into a radio frequency signal. In other words, the transmitting RF unit 251 performs up-conversion on the downlink signal. Thereafter, the transmitting RF unit 251 transmits the downlink signal converted into the radio frequency signal to the mobile station 3 through an antenna 26.

When the scheduling processing unit 30 performs the allocation of the radio resources of the S cell, the receiving RF unit 252 receives the uplink signal from the mobile station 3 through the antenna 26. Then, the receiving RF unit 252 converts the received uplink signal from the radio frequency into the baseband signal. In other words, the receiving RF unit 252 performs down-conversion on the uplink signal. Thereafter, the receiving RF unit 252 outputs the uplink signal converted into the baseband signal to the A/D converting unit 24.

When the scheduling processing unit 30 performs the allocation of the radio resources of the S cell, the A/D converting unit 24 receives, from the receiving RF unit 252, an input of the uplink signal converted into the baseband signal. Then, the A/D converting unit 24 converts the received uplink signal from the analog signal into the digital signal. Thereafter, the A/D converting unit 24 outputs the uplink signal converted into the digital signal to the receiving unit 22.

The receiving unit 22 includes a CP removing unit 221, an FFT unit 222, a data/pilot signal separating unit 223, a PUSCH/PUCCH reception processing unit 224, a pilot signal demodulating unit 225, a radio quality measuring unit 226, and the uplink MAC processing unit 229. The respective units of the receiving unit 22 perform the processes, as follows, based on various kinds of control signals output from the scheduling processing unit 30 when the scheduling processing unit 30 performs the allocation of the radio resources.

When the scheduling processing unit 30 performs the allocation of the radio resources of the S cell, the CP removing unit 221 receives, from the A/D converting unit 24, an input of the uplink signal converted into the digital signal. Then, the CP removing unit 221 removes the CP from the received uplink signal according to the control information received from the scheduling processing unit 30. Thereafter, the CP removing unit 221 outputs, to the FFT unit 222, the uplink signal from which the CP has been removed.

On the other hand, when the scheduling processing unit 30 stops the allocation of the radio resources of the S cell, the pilot signal demodulating unit 225 does not perform the pilot signal demodulation process since the allocation of the radio resources is stopped.

When the scheduling processing unit 30 performs the allocation of the radio resources of the S cell, the FFT unit 222 receives an input of the uplink signal from the CP removing unit 221. Then, the FFT unit 222 performs the fast Fourier transform on the received uplink signal according to the control information received from the scheduling processing unit 30, and converts a signal of the time domain into a signal of the frequency domain. Thereafter, the FFT unit 222 outputs the uplink signal that has undergone the fast Fourier transform to the data/pilot signal separating unit 223.

On the other hand, when the scheduling processing unit 30 stops the allocation of the radio resources of the S cell, the pilot signal demodulating unit 225 does not perform the pilot signal demodulation process since the allocation of the radio resources is stopped.

When the scheduling processing unit 30 performs the allocation of the radio resources of the S cell, the data/pilot signal separating unit 223 receives an input of the uplink signal that has undergone the fast Fourier transform from the FFT unit 222. Then, the data/pilot signal separating unit 223 separates the received uplink signal into the data signal and the pilot signal according to the control information received from the scheduling processing unit 30. Thereafter, the data/pilot signal separating unit 223 outputs the data signal to a data demodulating unit 228 of the PUSCH/PUCCH reception processing unit 224. Further, the data/pilot signal separating unit 223 outputs the pilot signal to the pilot signal demodulating unit 225.

On the other hand, when the scheduling processing unit 30 stops the allocation of the radio resources of the S cell, the pilot signal demodulating unit 225 does not perform the pilot signal demodulation process since the allocation of the radio resources is stopped.

The PUSCH/PUCCH reception processing unit 224 includes an error correction decoder 227 and the data demodulating unit 228. When the scheduling processing unit 30 performs the allocation of the radio resources, the data demodulating unit 228 receives an input of the data signal from the data/pilot signal separating unit 223. Further, the data demodulating unit 228 receives an input of the pilot signal included in the downlink signal from the pilot signal demodulating unit 225. Then, the data demodulating unit 228 performs the data demodulation process on the received data signal according to the pilot signal and the control information received from the scheduling processing unit 30. Thereafter, the data demodulating unit 228 outputs the data signal that has undergone the data demodulation process to the error correction decoder 227.

On the other hand, when the scheduling processing unit 30 stops the allocation of the radio resources of the S cell, the pilot signal demodulating unit 225 does not perform the pilot signal demodulation process since the allocation of the radio resources is stopped.

When the scheduling processing unit 30 performs the allocation of the radio resources of the S cell, the error correction decoder 227 receives an input of the data signal that has undergone the data demodulation process from the data demodulating unit 228. Then, the error correction decoder 227 performs the error correction decoding on the received data signal according to the control information received from the scheduling processing unit 30. Thereafter, the error correction decoder 227 outputs the data signal that has undergone the error correction decoding process to the uplink MAC processing unit 229.

On the other hand, when the scheduling processing unit 30 stops the allocation of the radio resources of the S cell, the pilot signal demodulating unit 225 does not perform the pilot signal demodulation process since the allocation of the radio resources is stopped.

When the scheduling processing unit 30 performs the allocation of the radio resources of the S cell, the pilot signal demodulating unit 225 receives, from the data/pilot signal separating unit 223, an input of the pilot signal transmitted from the mobile station 3. Then, the pilot signal demodulating unit 225 demodulates the received pilot signal according to the control information received from the scheduling processing unit 30. Thereafter, the pilot signal demodulating unit 225 outputs the demodulated pilot signal to the data demodulating unit 228, the radio quality measuring unit 226, and the moving speed measuring unit 50 which will be described later.

On the other hand, when the scheduling processing unit 30 stops the allocation of the radio resources of the S cell, the pilot signal demodulating unit 225 does not perform the pilot signal demodulation process since the allocation of the radio resources is stopped.

When the scheduling processing unit 30 performs the allocation of the radio resources of the S cell, the radio quality measuring unit 226 receives, from the data/pilot signal separating unit 223, an input of the pilot signal transmitted from the mobile station 3. Then, the radio quality measuring unit 226 measures the SIR using the received pilot signal. The radio quality measuring unit 226 outputs the measured SIR to the scheduling processing unit 30.

On the other hand, when the scheduling processing unit 30 stops the allocation of the radio resources of the S cell, the radio quality measuring unit 226 receives an instruction to stop radio quality measurement from the scheduling processing unit 30. Upon receiving the instruction, the radio quality measuring unit 226 stops the measurement of the radio quality. Thereafter, when the scheduling processing unit 30 resumes the allocation of the radio resources, the radio quality measuring unit 226 receives an instruction to start radio quality measurement start from the scheduling processing unit 30. Upon receiving the instruction, the radio quality measuring unit 226 starts the measurement of the radio quality.

When the scheduling processing unit 30 performs the allocation of the radio resources of the S cell, the uplink MAC processing unit 229 receives an input of the data signal from the error correction decoder 227. Then, the uplink MAC processing unit 229 performs the MAC process on the received data signal. Thereafter, the uplink MAC processing unit 229 outputs the data signal that has undergone the MAC process to the S1/X2 interface processing unit 60. Further, the uplink MAC processing unit 229 transmits information such as, a data amount of the uplink MAC CE, to the scheduling processing unit 30.

The scheduling processing unit 30 receives an input of the SIR from the radio quality measuring units 126 and 226. Further, the scheduling processing unit 30 receives an input of call control information from the RRC processing unit 40. Further, the scheduling processing unit 30 receives information, such as a data amount of the MAC CE, from the uplink MAC processing units 129 and 229. Then, the scheduling processing unit 30 performs the scheduling process of selecting the mobile station 3 that establishes communication with the wireless base station 1, using the received SIR and the call control information.

Here, the scheduling processing unit 30 preferably selects the mobile station 3 that actually establishes communication from among a plurality of mobile stations 3, in each of the case of the uplink signal process and the case of the downlink signal process. The scheduling processing unit 30 selects the mobile station 3 using, for example, a maximum CIR technique or a PF technique. However, a known another scheme may be used for the process of selecting the mobile station 3 by the scheduling processing unit 30.

Further, the scheduling processing unit 30 decides a demodulation scheme, a modulation scheme, and a transmission rate to be used in communication with the selected mobile station 3, based on the received data amount of the MAC CE and the SIR information.

Then, the scheduling processing unit 30 outputs information of the selected mobile station 3 and the like to the RRC processing unit 40.

Further, the scheduling processing unit 30 notifies the error correction coder 112, the data modulating unit 113, the data/pilot signal multiplexing unit 114, the IFFT unit 115, and the CP inserting unit 116 of the control information including the information of the selected mobile station 3, the modulation scheme, and the transmission rate. Further, the scheduling processing unit 30 notifies the CP removing unit 121, the FFT unit 122, the data/pilot signal separating unit 123, the PUSCH/PUCCH reception processing unit 124, and the pilot signal demodulating unit 125 of the control information including the information of the selected mobile station 3, the demodulation scheme, and the transmission rate.

Meanwhile, the scheduling processing unit 30 stores, in advance, a moving speed threshold value used to determine whether or not the S cell is used in the communication with the mobile station 3. The scheduling processing unit 30 receives an input of the moving speed of the mobile station 3 from the moving speed measuring unit 50. Then, the scheduling processing unit 30 determines whether or not the moving speed of the mobile station 3 is equal to or more than the moving speed threshold value.

Further, when the moving speed of the mobile station 3 is less than the moving speed threshold value, the scheduling processing unit 30 notifies the error correction coder 212, the data modulating unit 213, the data/pilot signal multiplexing unit 214, the IFFT unit 215, and the CP inserting unit 216 of the control information. The control information includes the information of the selected mobile station 3, the modulation scheme, and the transmission rate. Further, the scheduling processing unit 30 outputs the control information to the CP removing unit 221, the FFT unit 222, and the data/pilot signal separating unit 223. Further, the scheduling processing unit 30 notifies the PUSCH/PUCCH reception processing unit 224 and the pilot signal demodulating unit 225 of similar control information. The control information includes the information of the selected mobile station 3, the demodulation scheme, and the transmission rate.

On the other hand, when the moving speed of the mobile station 3 is equal to or more than the moving speed threshold value, the scheduling processing unit 30 stops the allocation of the radio resources of the S cell. Then, the scheduling processing unit 30 stops notifying the error correction coder 212, the data modulating unit 213, the data/pilot signal multiplexing unit 214, the IFFT unit 215, and the CP inserting unit 216 of the control information. Further, the scheduling processing unit 30 stops notifying the data/pilot signal multiplexing unit 214, the CP removing unit 221, the FFT unit 222, and the data/pilot signal separating unit 223 of the control information. Further, the scheduling processing unit 30 instructs the downlink MAC processing unit 117 to transmit the Activation/Deactivation MAC CE indicating the Deactivation. Furthermore, the scheduling processing unit 30 gives a radio quality measurement stop notification to the radio quality measuring unit 226.

Thereafter, when the moving speed of the mobile station 3 is less than the moving speed threshold value, the scheduling processing unit 30 instructs the downlink MAC processing unit 117 to transmit the Activation/Deactivation MAC CE indicating the Activation. Further, the scheduling processing unit 30 gives a radio quality measurement resumption notification to the radio quality measuring unit 226. Thereafter, the scheduling processing unit 30 resumes the allocation of the radio resources of the S cell. Then, the scheduling processing unit 30 resumes notifying the error correction coder 212, the data modulating unit 213, the data/pilot signal multiplexing unit 214, the IFFT unit 215, and the CP inserting unit 216 of the control information. Further, the scheduling processing unit 30 resumes notifying the CP removing unit 221, the FFT unit 222, and the data/pilot signal separating unit 223 of the control information. The scheduling processing unit 30 is an example of a "control unit".

The RRC processing unit 40 receives an input of a state of the selected mobile station 3 and the like from the scheduling processing unit 30. Then, the RRC processing unit 40 performs a transceiving process related to the RRC layer using the received control information. Specifically, the RRC processing unit 40 performs call receiving control (e.g. paging, call establishment, or call release) or connection switching control (e.g. handover) on the mobile station 3. The RRC processing unit 40 outputs the RRC message to the S1/X2 interface processing unit 60 at the time of the connection switching control. Further, the RRC processing unit 40 outputs call control information to the scheduling processing unit 30.

The moving speed measuring unit 50 receives an input of the pilot signal from the pilot signal demodulating units 125 and 225. The pilot signal is, for example, the SRS. Then, the moving speed measuring unit 50 estimates the fading frequency using the received pilot signal. For example, the moving speed measuring unit 50 performs two or more sets of delay detections, in which a slot time is used as a unit, on the pilot signal. Then, the moving speed measuring unit 50 extracts a real number part of each of delay detection outputs, and calculates two or more sets of slot time correlation values. Next, the moving speed measuring unit 50 performs processing using a slot time correlation value corresponding to a delay detection output by a smallest slot delay among the two or more sets of slot time correlation values and a slot time correlation value corresponding to a delay detection output by other slot delay as a denominator and a numerator, respectively. As a result, the moving speed measuring unit 50 measures a fading frequency estimation value. However, the fading frequency estimation method described herein is an example, and the moving speed measuring unit 50 may estimate the fading frequency using any other method.

Then, the moving speed measuring unit 50 calculates the moving speed of the mobile station 3 by multiplying a wavelength of a carrier wave to be wirelessly used by the fading frequency. In other words, V(m/s) indicating the moving speed of the mobile station 3 is represented by "V(m/s)=wavelength (m) of carrier wave to be wirelessly used×fading frequency (Hz)". Thereafter, the moving speed measuring unit 50 outputs the calculated moving speed of the mobile station 3 to the scheduling processing unit 30. The moving speed measuring unit 50 is an example of a "measuring unit".

Figure 4:
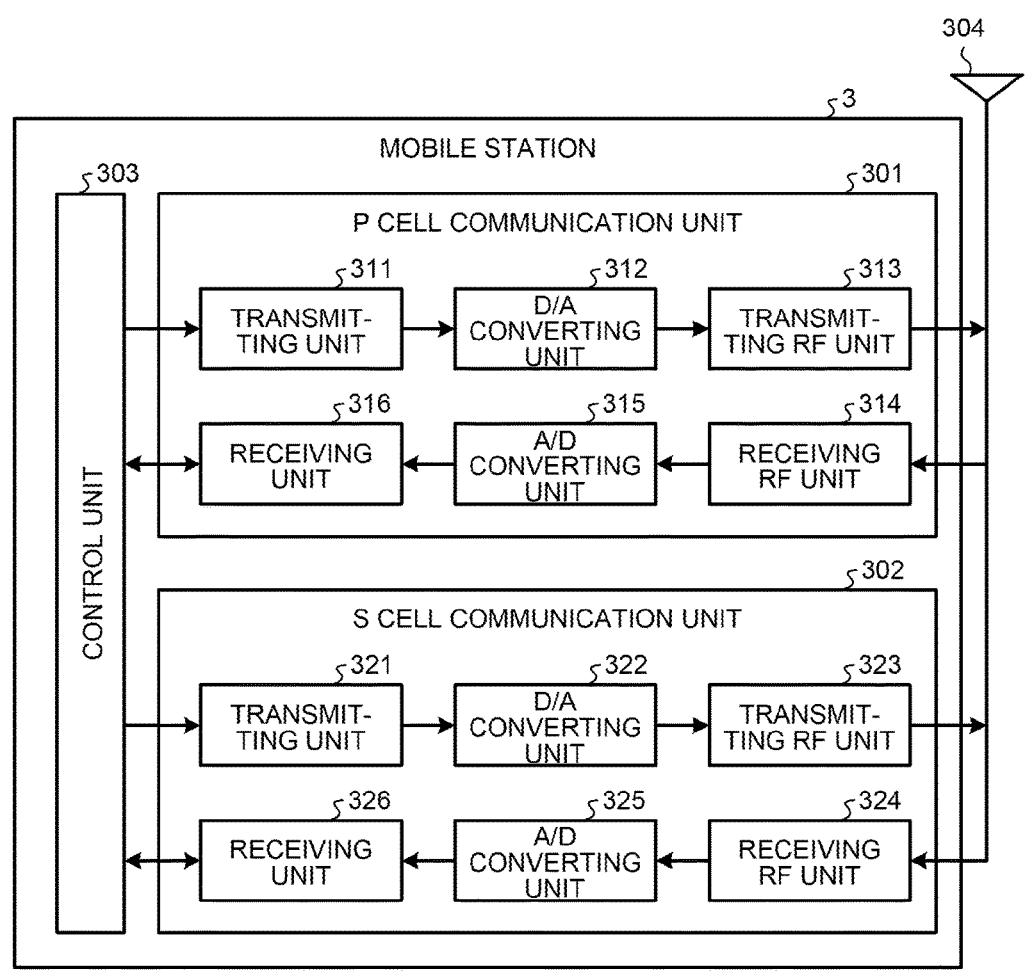
FIG. 4 is a block diagram of a mobile station.

Next, the mobile station 3 according to the present embodiment will be described with reference to FIG. 4. FIG. 4 is a block diagram of the mobile station. The mobile station 3 includes a P cell communication unit 301, an S cell communication unit 302, and a control unit 303, as illustrated in FIG. 4.

The P cell communication unit 301 includes a transmitting unit 311, a D/A converting unit 312, a transmitting RF unit 313, a receiving RF unit 314, an A/D converting unit 315, and a receiving unit 316.

The transmitting unit 311 receives, from the control unit 303, an input of a signal that is transmitted using the radio resources of the P cell. Then, the transmitting unit 311 performs the transmission process, such as the encoding process and the modulation process, on the acquired signal. Thereafter, the transmitting unit 311 outputs the signal that has undergone the transmission process to the D/A converting unit 312.

The D/A converting unit 312 receives an input of the signal that has undergone the transmission process from the transmitting unit 311. Then, the D/A converting unit 312 converts the acquired signal into an analog signal. Thereafter, the D/A converting unit 312 outputs the signal converted into the analog signal to the transmitting RF unit 313.

The transmitting RF unit 313 receives, from the D/A converting unit 312, an input of the signal converted into the analog signal. Then, the transmitting RF unit 313 converts the acquired signal into a radio frequency signal. Thereafter, the transmitting RF unit 313 transmits the signal converted into the radio frequency signal to the wireless base station 1 through an antenna 304.

The receiving RF unit 314 receives an input of the signal of the P cell side transmitted from the wireless base station 1 through the antenna 304. The signal includes radio resource allocation information as well. Then, the receiving RF unit 314 converts the acquired signal into a baseband signal. Thereafter, the receiving RF unit 314 outputs the signal converted into the baseband signal to the A/D converting unit 315.

The A/D converting unit 315 receives, from the receiving RF unit 314, an input of the signal converted into the baseband signal. Then, the A/D converting unit 315 converts the acquired signal into a digital signal. Thereafter, the A/D converting unit 315 outputs the signal converted into the digital signal to the receiving unit 316.

The receiving unit 316 receives an input of the signal converted into the digital signal from the A/D converting unit 315. Then, the receiving unit 316 performs a reception process, such as a decoding process and a demodulation process, on the acquired signal. Thereafter, the receiving unit 316 outputs the signal that has undergone the reception process to the control unit 303. Particularly, when the signal is the control signal, the receiving unit 316 extracts, from the acquired signal, radio resource allocation information corresponding to a downlink and an uplink for communication with the wireless base station 1. Then, the receiving unit 316 outputs the radio resource allocation information to the control unit 303.

The S cell communication unit 302 includes a transmitting unit 321, a D/A converting unit 322, a transmitting RF unit 323, a receiving RF unit 324, an A/D converting unit 325, and a receiving unit 326.

The transmitting unit 321 receives, from the control unit 303, an input of a signal that is transmitted using the radio resources of the S cell. Then, the transmitting unit 321 performs the transmission process, such as the encoding process and the modulation process, on the acquired signal. Thereafter, the transmitting unit 321 outputs the signal that has undergone the transmission process to the D/A converting unit 322.

The D/A converting unit 322 receives an input of the signal that has undergone the transmission process from the transmitting unit 321. Then, the D/A converting unit 322 converts the acquired signal into an analog signal. Thereafter, the D/A converting unit 322 outputs the signal converted into the analog signal to the transmitting RF unit 323.

The transmitting RF unit 323 receives, from the D/A converting unit 322, an input of the signal converted into the analog signal. Then, the transmitting RF unit 323 converts the acquired signal into a radio frequency signal. Thereafter, the transmitting RF unit 323 transmits the signal converted into the radio frequency signal to the wireless base station 1 through the antenna 304.

On the other hand, when the Deactivation is transmitted from the wireless base station 1, the transmitting unit 321, the D/A converting unit 322, and the transmitting RF unit 323 do not perform signal transmission since signal transmission using the radio resources of the S cell is not performed.

The receiving RF unit 324 receives an input of the signal of the P cell side transmitted from the wireless base station 1 through the antenna 304. The signal includes the radio resource allocation information as well. Then, the receiving RF unit 324 converts the acquired signal into a baseband signal. Thereafter, the receiving RF unit 324 outputs the signal converted into the baseband signal to the A/D converting unit 325.

The A/D converting unit 325 receives, from the receiving RF unit 324, an input of the signal converted into the baseband signal. Then, the A/D converting unit 325 converts the acquired signal into a digital signal. Thereafter, the A/D converting unit 325 outputs the signal converted into the digital signal to the receiving unit 326.

The receiving unit 326 receives an input of the signal converted into the digital signal from the A/D converting unit 325. Then, the receiving unit 326 performs the reception process, such as the decoding process and the demodulation process, on the acquired signal. Thereafter, the receiving unit 326 outputs the signal that has undergone the reception process to the control unit 303. Particularly, when the signal is the control signal, the receiving unit 326 extracts, from the acquired signal, the radio resource allocation information corresponding to the downlink and the uplink for communication with the wireless base station 1. Then, the receiving unit 326 outputs the radio resource allocation information to the control unit 303.

Further, when the scheduling processing unit 30 of the wireless base station 1 stops the allocation of the radio resources of the S cell, the receiving RF unit 324 receives the Deactivation signal. Then, the receiving RF unit 324, the A/D converting unit 325, and the receiving unit 326 perform various kinds of processes on the Deactivation signal, and output the resultant data to the control unit 303.

In this case, since the signal using the radio resources of the S cell is not transmitted from the wireless base station 1, the receiving RF unit 324, the A/D converting unit 325, and the receiving unit 316 do not perform signal reception.

Thereafter, when the scheduling processing unit 30 of the wireless base station 1 resumes the allocation of the radio resources of the S cell, the receiving RF unit 324 receives the Activation signal. Then, the receiving RF unit 324, the A/D converting unit 325, and the receiving unit 326 perform various kinds of processes on the Activation signal, and output the resultant data to the control unit 303.

The control unit 303 receives an input of the signal transmitted from the wireless base station 1 from the receiving unit 316 or 326.

Particularly, when the signal is the control signal, the control unit 303 receives, from the receiving unit 316 or 326, an input of the radio resource allocation information corresponding to the downlink and the uplink for communication with the wireless base station 1. Then, the control unit 303 performs control of the data transceiving process on the transmitting units 311 and 321 and the receiving units 316 and 326 according to the acquired radio resource allocation information.

Further, when the scheduling processing unit 30 of the wireless base station 1 stops the allocation of the radio resources of the S cell, the control unit 303 receives the Deactivation instruction from the receiving unit 326. In this case, the control unit 303 stops data transmission using the radio resources of the S cell. Further, the control unit 303 stops transmission of the pilot signal such as the SRS using the radio resources of the S cell.

Thereafter, when the scheduling processing unit 30 of the wireless base station 1 resumes the allocation of the radio resources of the S cell, the control unit 303 receives the Activation instruction from the receiving unit 326. In this case, the control unit 303 resumes data transmission using the radio resources of the S cell. Further, the control unit 303 resumes transmission of the pilot signal such as the SRS using the radio resources of the S cell.

Figure 5:
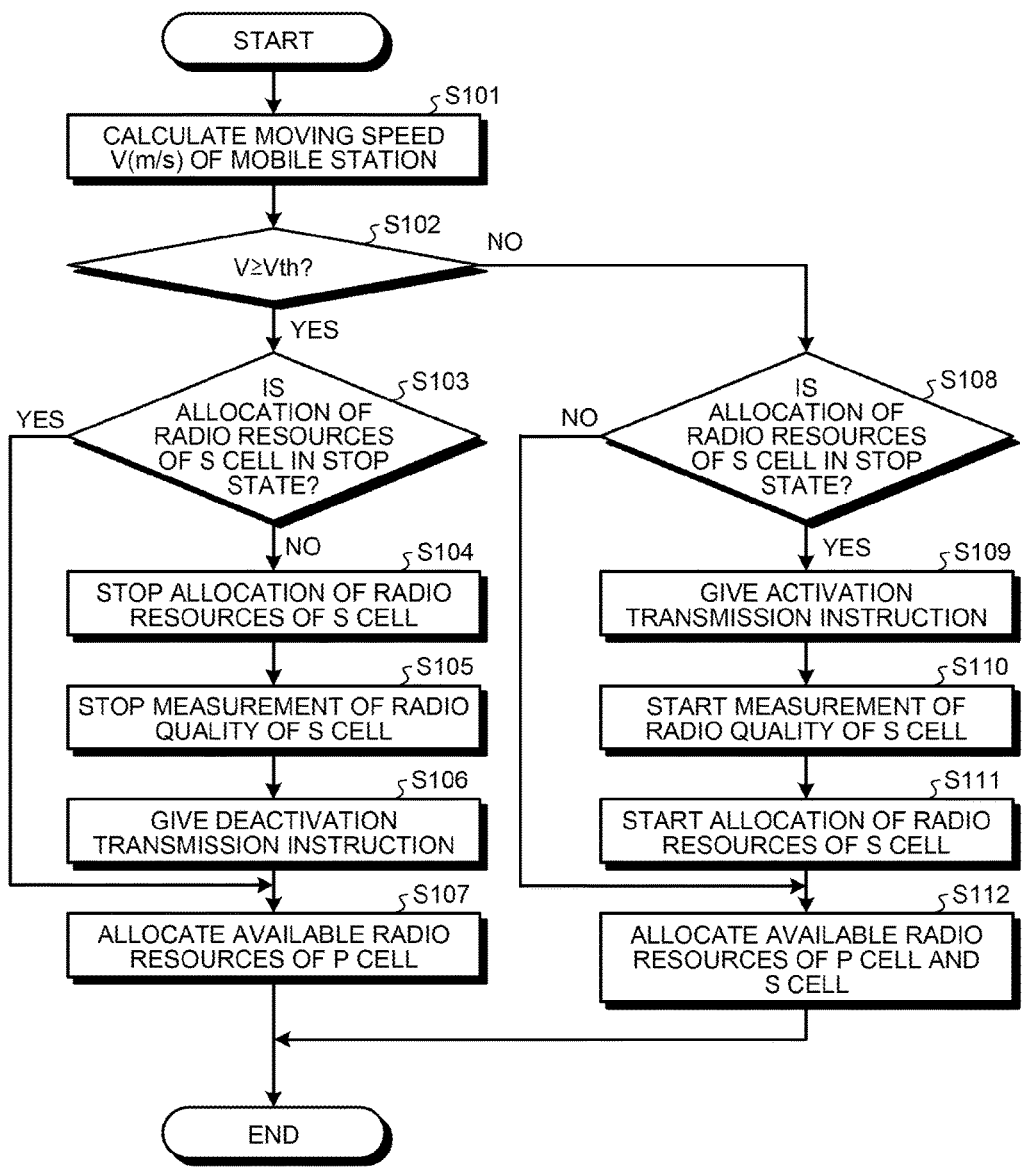
FIG. 5 is a flowchart of a process of allocating radio resources of an S cell by the wireless base station according to the first embodiment.

Next, the flow of the process of allocating the radio resources of the S cell by the wireless base station 1 according to the present embodiment will be described with reference to FIG. 5. FIG. 5 is a flowchart of the process of allocating the radio resources of the S cell by the wireless base station according to the first embodiment.

The moving speed measuring unit 50 calculates a moving speed V(m/s) of the mobile station 3 using the pilot signal acquired from the pilot signal demodulating unit 125 of the P cell communication unit 10 (Step S101).

The scheduling processing unit 30 receives an input of the moving speed V(m/s) from the moving speed measuring unit 50. Then, the scheduling processing unit 30 determines whether or not the moving speed V is equal to or more than a moving speed threshold value Vth (Step S102). When V≥Vth (Yes in Step S102), the scheduling processing unit 30 determines whether or not the allocation of the radio resources of the S cell is in a stop state (Step S103).

When the allocation of the radio resources of the S cell is in the stop state (Yes in Step S103), the scheduling processing unit 30 proceeds to Step S107.

On the other hand, when the allocation of the radio resources of the S cell is in the stop state (No in Step S103), the scheduling processing unit 30 stops the allocation of the radio resources of the S cell (Step S104).

Further, the scheduling processing unit 30 instructs the radio quality measuring unit 226 to stop the measurement of the radio quality. Upon receiving the instruction, the radio quality measuring unit 226 stops the measurement of the radio quality of the S cell (Step S105).

Further, the scheduling processing unit 30 instructs the downlink MAC processing unit 117 to transmit the Activation/Deactivation MAC CE indicating the Deactivation (Step S106).

Then, the scheduling processing unit 30 performs the allocation of the available radio resources of the P cell, and establishes communication with the mobile station 3 (Step S107).

On the other hand, when V<Vth (No in Step S102), the scheduling processing unit 30 determines whether or not the allocation of the radio resources of the S cell is in the stop state (Step S108). When the allocation of the radio resources of the S cell is not in the stop state (No in Step S108), the scheduling processing unit 30 proceeds to Step S112.

On the other hand, when the allocation of the radio resources of the S cell is in the stop state (Yes in Step S108), the scheduling processing unit 30 instructs the downlink MAC processing unit 117 to transmit the Activation (Step S109). The Activation is also performed using the Activation/Deactivation MAC CE.

Further, the scheduling processing unit 30 instructs the radio quality measuring unit 226 to start the measurement of the radio quality. Upon receiving the instruction, the radio quality measuring unit 226 starts the measurement of the radio quality of the S cell (Step S110).

Further, the scheduling processing unit 30 starts the allocation of the radio resources of the S cell (Step S111).

Then, the scheduling processing unit 30 performs the allocation of the available radio resources of the P cell and the S cell, and establishes communication with the mobile station 3 (Step S112).

Figure 6:
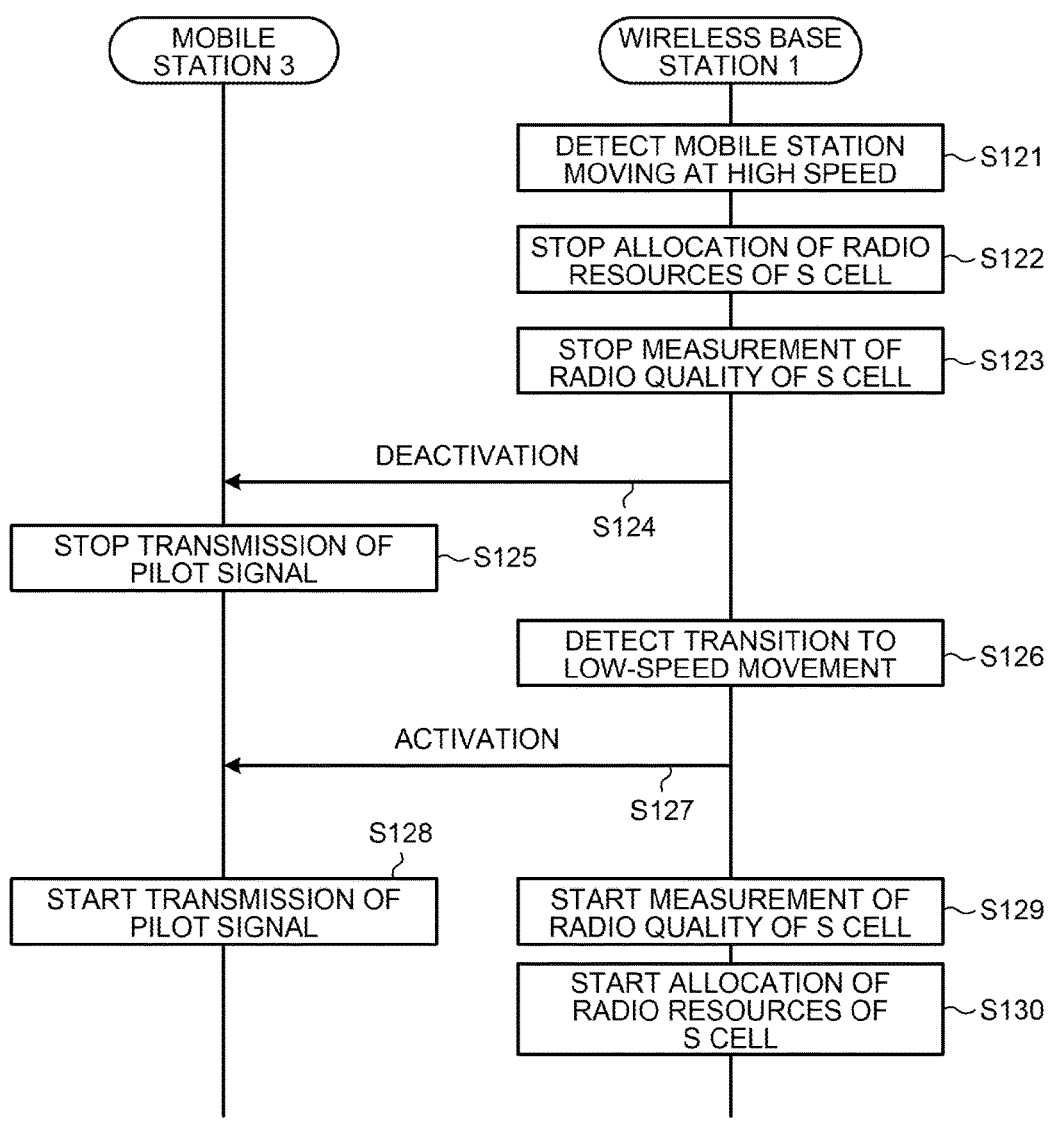
FIG. 6 is a sequence diagram of a process of allocating radio resources of an S cell between the wireless base station and the mobile station according to the first embodiment.

Next, the flow of the process of allocating the radio resource of the S cell between the wireless base station 1 and the mobile station 3 according to the present embodiment will be described with reference to FIG. 6. FIG. 6 is a sequence diagram of the process of allocating the radio resources of the S cell between the wireless base station and the mobile station according to the first embodiment.

The scheduling processing unit 30 of the wireless base station 1 compares the moving speed of the mobile station 3 with the moving speed threshold value, and detects the mobile station 3 that is moving at a high speed (Step S121).

Then, the scheduling processing unit 30 of the wireless base station 1 stops the allocation of the radio resources of the S cell (Step S122).

Further, the radio quality measuring unit 226 of the wireless base station 1 stop the measurement of the radio quality of the S cell (Step S123).

Further, the wireless base station 1 transmits the Activation/Deactivation MAC CE indicating the Deactivation to the mobile station 3 (Step S124).

The control unit 303 of the mobile station 3 receives the Deactivation signal. Then, the control unit 303 stops the transmission of the pilot signal such as the SRS (Step S125).

Thereafter, the scheduling processing unit 30 of the wireless base station 1 compares the moving speed of the mobile station 3 with the moving speed threshold value, and detects that the mobile station 3 in a high speed movement has transitioned to a low-speed movement state (Step S126).

Then, the wireless base station 1 transmits the Activation/Deactivation MAC CE indicating the Activation to the mobile station 3 (Step S127).

The control unit 303 of the mobile station 3 receives the Activation signal. Then, the control unit 303 starts the transmission of the pilot signal such as the SRS (Step S128).

Further, the radio quality measuring unit 226 of the wireless base station 1 starts the measurement of the radio quality of the S cell (Step S129).

The scheduling processing unit 30 of the wireless base station 1 starts the allocation of the radio resources of the S cell (Step S130).

As described above, the wireless base station according to the present embodiment determines the moving speed of the mobile station using the pilot signal of the P cell side, determines a wireless environment based on an increase or a decrease in the moving speed, and determines whether or not the allocation of the radio resources of the S cell is to be performed. Further, when the radio resources of the S cell re not allocated, the wireless base station according to the present embodiment stops the measurement of the radio quality of the S cell, as well as causes the mobile station to stop the transmission of the pilot signal of the S cell. As a result, it is possible to prevent the radio resources from being allocated to the mobile station that has a high moving speed and a bad wireless environment, thereby improving the throughput of the entire wireless communication system. In addition, it is possible to reduce the processing load of the radio quality measurement, thereby reducing the power consumption of the wireless base station as well. Further, in the mobile station, the lifespan of a battery can be increased by stopping the transmission of the pilot signal. Furthermore, when the moving speed is decreased, by resuming the allocation of the radio resources of the S cell, it is possible to reduce the radio resources being wasted by repetition of the re-transmission process under the environment of the bad radio quality.

Further, the process is simpler as compared to the case of releasing SRS resources or a radio link which will be described later, since a process of releasing SRS resources or a radio link and a process of resetting SRS resources or a radio link are not performed, and it is possible to resume the allocation of the radio resources of the S cell rapidly. It is possible to resume the allocation of the radio resources of the S cell at an appropriate timing without using the radio quality measurement, allowing improvement in the radio quality while suppressing the processing load and the power consumption.

Here, in the present embodiment, the determination as to whether or not the wireless environment has gotten worse when the allocation of the radio resources of the S cell is stopped is performed using the moving speed. It is because a criterion used to determine whether the allocation of the radio resources is stopped or resumed is standardized, and thus the process is simplified. However, the determination of the wireless environment may be performed using any other method as long as it is possible to determine that the wireless environment has gotten worse. For example, when the reception NG determination of the PUSCH is made more frequently, the scheduling processing unit 30 may determine that the wireless environment has gotten worse and stop the allocation of the radio resources of the S cell.

Further, in the present embodiment, the generation and transmission of the Activation and the Deactivation of the MAC CE indicating the stop and the resumption of the allocation of the radio resources of the S cell, respectively, are performed in the P cell. However, when a plurality of S cells are set between the wireless base station 1 and the mobile station 3, the MAC CE may be transmitted using another S cell in which the allocation of the radio resources is not stopped.

Modified Example

Figure 7:
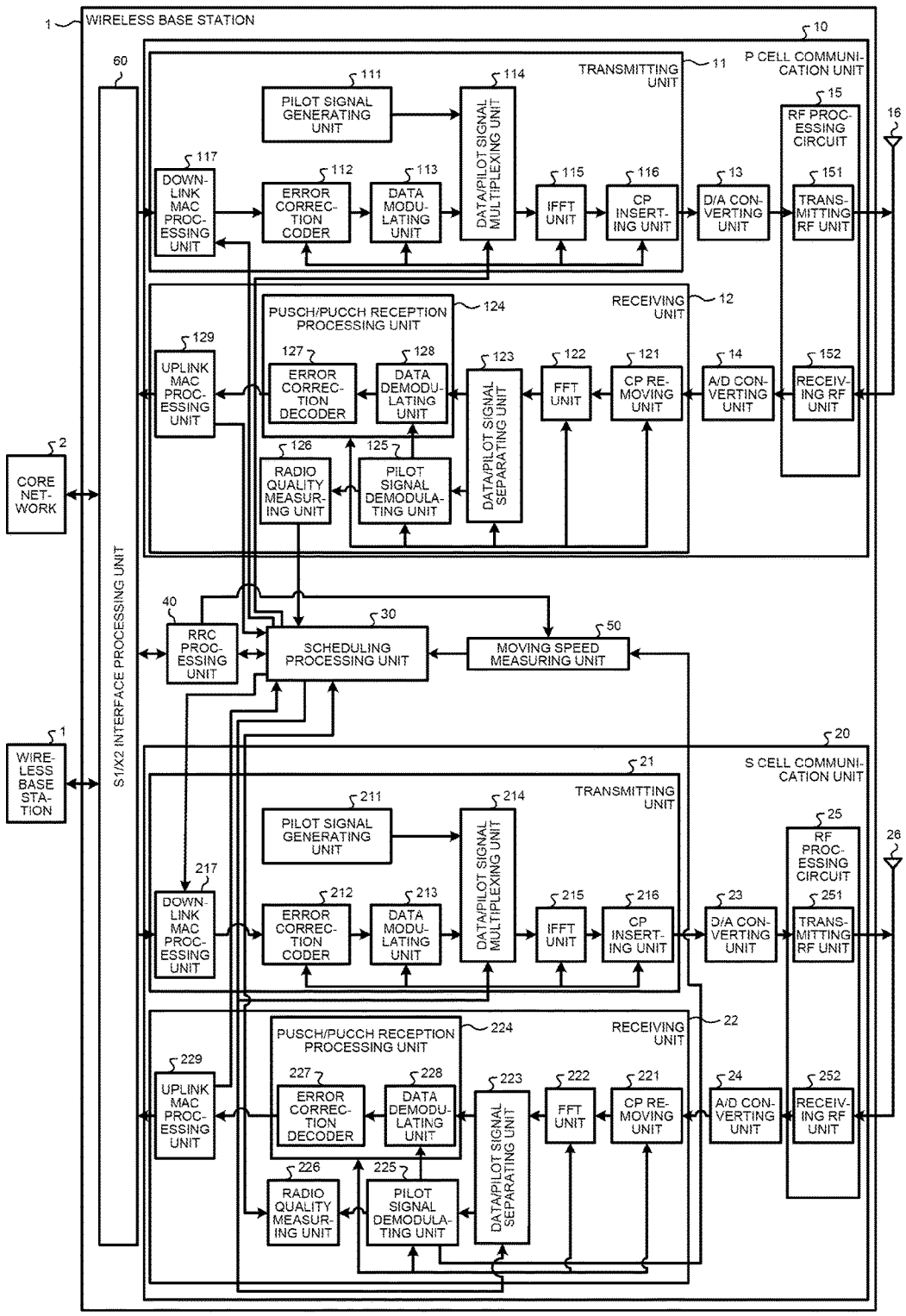
FIG. 7 is a block diagram of a wireless base station according to a modified example.

In the first embodiment, the moving speed measuring unit 50 estimates the fading frequency and obtains the moving speed of the mobile station 3; however, the method of calculating the moving speed is not limited to the example. The moving speed measuring unit 50 may obtain the moving speed of the mobile station using, for example, the position information. In this regard, an example in which the moving speed of the mobile station 3 is calculated using the position information will be described. FIG. 7 is a block diagram of a wireless base station according to a modified example.

The moving speed measuring unit 50 acquires the position information of the mobile station 3 from the RRC processing unit 40 at intervals of position information acquisition periods. The moving speed measuring unit 50 may use information of "longitude", "latitude", and "altitude" specified in ellipsoidPointWithAltitude in LocationInfo as the position information of the mobile station. The moving speed measuring unit 50 measures the position information by a predetermined number of position information acquisitions.

Then, the moving speed measuring unit 50 obtains a movement distance based on position information at a certain timing among the acquired position information and position information at an immediately previous timing, and obtains a moving speed at the timing by dividing the obtained movement distance by the position information acquisition period. Here, position information NewPos at a certain timing is assumed to be (NLat,NLon,NAlt). Further, position information OldPos at an immediately previous timing is assumed to be (OLat,OLon,OAlt). Here, NLat and OLat indicate the latitude, NLon and OLon indicate the longitude, and NAlt and OAlt indicate the altitude. Further, when the position information acquisition period is T, the moving speed V(m/s) of the mobile station 3 is expressed by the following Formula (1).

$$V\left[\frac{m}{s}\right] = \frac{\sqrt{(NLat - OLat)^2 + (NLon - OLon)^2 + (NAlt - OAlt)^2}}{T} \quad (1)$$

The moving speed measuring unit 50 obtains the moving speeds at respective timings by the above-described method, and calculates an average of the obtained respective moving speeds. Then, the moving speed measuring unit 50 outputs the calculated value, to the scheduling processing unit 30, as the moving speed. Here, when the number of movement information acquisitions is CntTh, and the moving speed at each timing is Vi, an average moving speed AveV(m/s) is expressed by the following Formula (2).

$$AveV\left[\frac{m}{s}\right] = \frac{\sum_{i=1}^{CntTh} Vi}{T} \quad (2)$$

Here, in order to improve the accuracy of the moving speed, the speed is obtained multiple times, and an average of the obtained moving speeds is used as the moving speed. However, the present invention is not limited to this example, and the moving speed measuring unit 50 may calculate the moving speed once and then output the calculated value, to the scheduling processing unit 30, as the moving speed.

Figure 8:
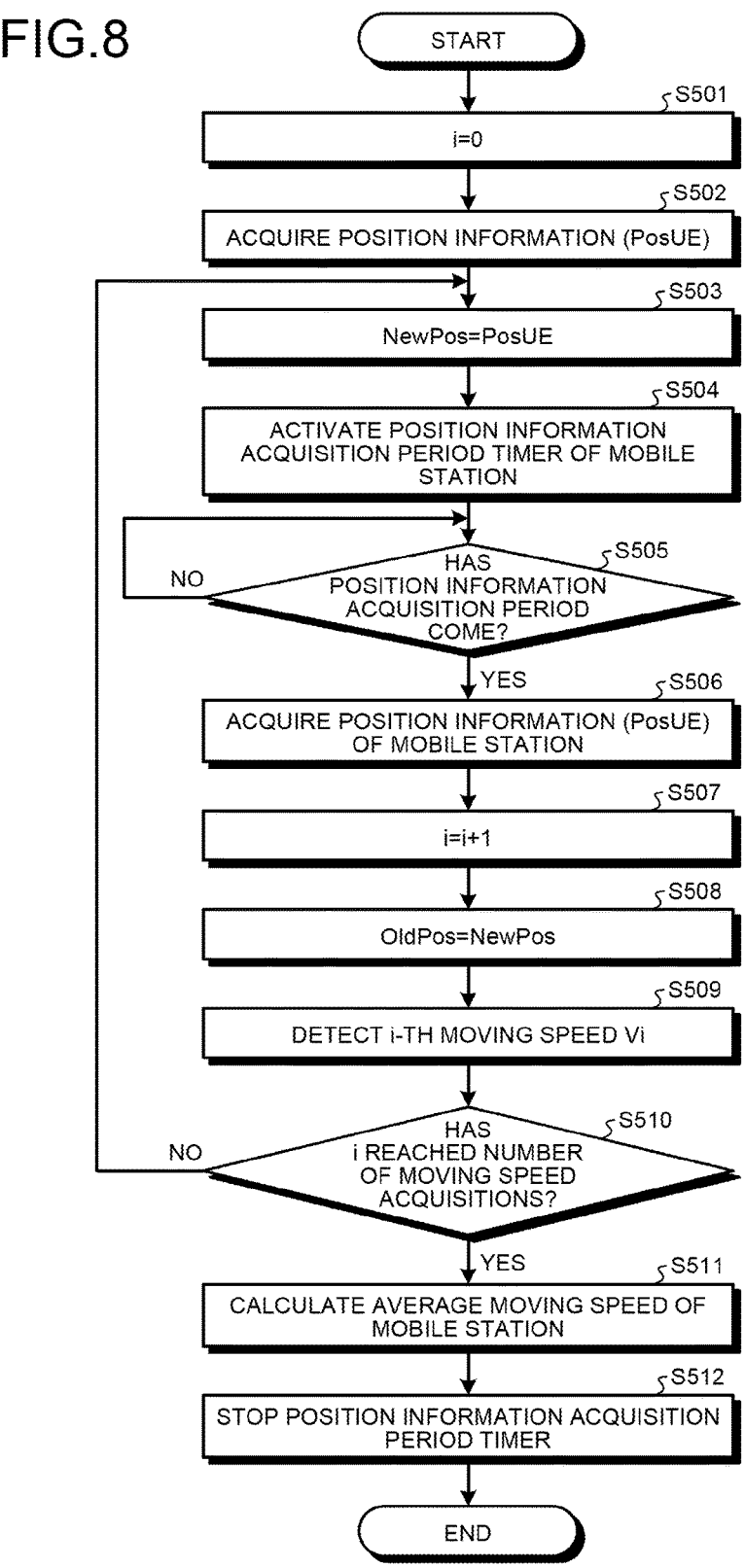
FIG. 8 is a flowchart of a moving speed calculation by a moving speed measuring unit according to a modified example.

Next, the flow of the moving speed calculation by the moving speed measuring unit according to the present modified example will be described with reference to FIG. 8. FIG. 8 is a flowchart of the moving speed calculation by the moving speed measuring unit according to the modified example.

The moving speed measuring unit 50 sets the number of position information acquisitions to 0. In other words, when the number of position information acquisitions is i, the moving speed measuring unit 50 sets i=0 (Step S501).

Then, the moving speed measuring unit 50 acquires the position information (PosUE) of the mobile station 3 from the RRC processing unit 40 (Step S502).

Then, the moving speed measuring unit 50 sets the acquired position information (PosUE) as new position information (NewPos). In other words, the moving speed measuring unit 50 sets NewPos=PosUE (Step S503).

Then, the moving speed measuring unit 50 activates a position information acquisition period timer of the mobile station 3 (Step S504). The position information acquisition period timer is provided in the moving speed measuring unit 50.

The moving speed measuring unit 50 determines whether or not the position information acquisition period has come using the position information acquisition period timer (Step S505). When the position information acquisition period has not come (No in Step S505), the moving speed measuring unit 50 is on standby until the position information acquisition period comes.

When the position information acquisition period has come (Yes in Step S505), the moving speed measuring unit 50 acquires the position information (PosUE) of the mobile station 3 (Step S506).

Then, the moving speed measuring unit 50 increases the number i of position information acquisitions by 1 (Step S507).

Then, the moving speed measuring unit 50 sets a current new position information (NewPos) as an immediately previous position information (OldPos). In other words, the moving speed measuring unit 50 sets OldPos=NewPos (Step S508).

Then, the moving speed measuring unit 50 calculates an i-th moving speed Vi using Formula (1) (Step S509).

Thereafter, the moving speed measuring unit 50 determines whether or not the number i of position information acquisitions has reached the number of moving speed acquisitions (Step S510). When the number i of position information acquisitions has not reached the number of moving speed acquisitions (No in Step S510), the moving speed measuring unit 50 returns to Step S503.

On the other hand, when the number i of position information acquisitions has reached the number of moving speed acquisitions (Yes in Step S510), the moving speed measuring unit 50 calculates an average moving speed of the mobile station 3 using Formula (2) (Step S511).

Thereafter, the moving speed measuring unit 50 stops the position information acquisition period timer (Step S512), and ends the calculation of the moving speed of the mobile station 3.

As described above, various methods can be used as the moving speed calculation method. Further, even when the moving speed calculation methods are different, the same effects as in the first embodiment can be obtained.

Second Embodiment

Next, a second embodiment will be described. The wireless base station according to the present embodiment differs from that of the first embodiment in that the SRS resources of the S cell are released. The wireless base station according to the present embodiment has the same configuration as that illustrated in FIG. 3. In the following, a description of functions of the same units as those in the first embodiment will not be repeated.

When the scheduling processing unit 30 determines that the moving speed of the mobile station 3 acquired from the moving speed measuring unit 50 is equal to or more than the moving speed threshold value, the scheduling processing unit 30 stops the allocation of the radio resources of the S cell to the mobile station 3.

Further, the scheduling processing unit 30 releases the SRS resources of the S cell set to the mobile station 3 whose moving speed is equal to or more than the moving speed threshold value. Specifically, the scheduling processing unit 30 stores the SRS resources currently set to respective mobile stations 3 in association with the mobile stations 3. Then, the scheduling processing unit 30 releases the SRS resources by canceling the stored correspondence between the mobile station 3 and the set SRS resource. As a result, the scheduling processing unit 30 stops the measurement of the radio quality by the radio quality measuring unit 226. Then, as the SRS resources are released, the scheduling processing unit 30 can set the released SRS resource to another mobile station 3.

Further, the scheduling processing unit 30 instructs the RRC processing unit 40 to give an SRS resource release notification.

Thereafter, when the moving speed of the mobile station 3 is less than the moving speed threshold value, the scheduling processing unit 30 sets the SRS resources of the S cell to the mobile station 3.

Further, the scheduling processing unit 30 instructs the RRC processing unit 40 to give an SRS resource release notification.

Further, the scheduling processing unit 30 notifies the radio quality measuring unit 226 of the start of the measurement of the radio quality.

Then, the scheduling processing unit 30 resumes the allocation of the radio resources of the S cell to the mobile station 3 whose moving speed is less than the moving speed threshold value.

When the allocation of the radio resources of the S cell to the mobile station 3 is stopped, the RRC processing unit 40 receives the SRS resource release notification from the scheduling processing unit 30. Then, the RRC processing unit 40 generates an RRC message for releasing the SRS resources of the S cell. Then, the RRC processing unit 40 transmits the generated RRC message to the mobile station 3 through the S1/X2 interface processing unit 60, the downlink MAC processing unit 117, the transmitting unit 11, the D/A converting unit 13, the transmitting RF unit 151, and the antenna 16.

Thereafter, when the allocation of the radio resources to the mobile station 3 is resumed, the RRC processing unit 40 receives an SRS resource setting notification from the scheduling processing unit 30. Then, the RRC processing unit 40 generates an RRC message for setting the SRS resources of the S cell. Then, the RRC processing unit 40 transmits the generated RRC message to the mobile station 3 through the S1/X2 interface processing unit 60, the downlink MAC processing unit 117, the transmitting unit 11, the D/A converting unit 13, the transmitting RF unit 151, and the antenna 16.

Here, currently, in the 3rd Generation Partnership Project (3GPP), the RRC message for releasing or setting the SRS resources of the S cell is not defined. In this regard, in the present embodiment, the RRC processing unit 40 uses the RRC message for releasing the SRS resources of the S cell and the RRC message for setting the SRS resources of the S cell which are newly defined.

When the scheduling processing unit 30 releases the SRS resources of the S cell for the mobile station 3, the radio quality measuring unit 226 does not receive the pilot signal such as the SRS, and stops the measurement of the radio quality.

Thereafter, when the allocation of the radio resources of the S cell to the mobile station 3 is resumed, the radio quality measuring unit 226 receives an instruction to measure the radio quality of the S cell of the mobile station 3 from the scheduling processing unit 30. Upon receiving the instruction, the radio quality measuring unit 226 resumes the measurement of the radio quality of the S cell of the mobile station 3.

The control unit 303 of the mobile station 3 receives the RRC message for releasing the SRS resources through the antenna 304 and the S cell communication unit 302. Then, the control unit 303 stops the pilot transmission including the SRS.

Thereafter, when the allocation of the radio resources to the mobile station 3 is resumed, the control unit 303 of the mobile station 3 receives the RRC message for setting the SRS resources through the antenna 304 and the S cell communication unit 302. Then, the control unit 303 resumes the pilot transmission including the SRS.

Figure 9:
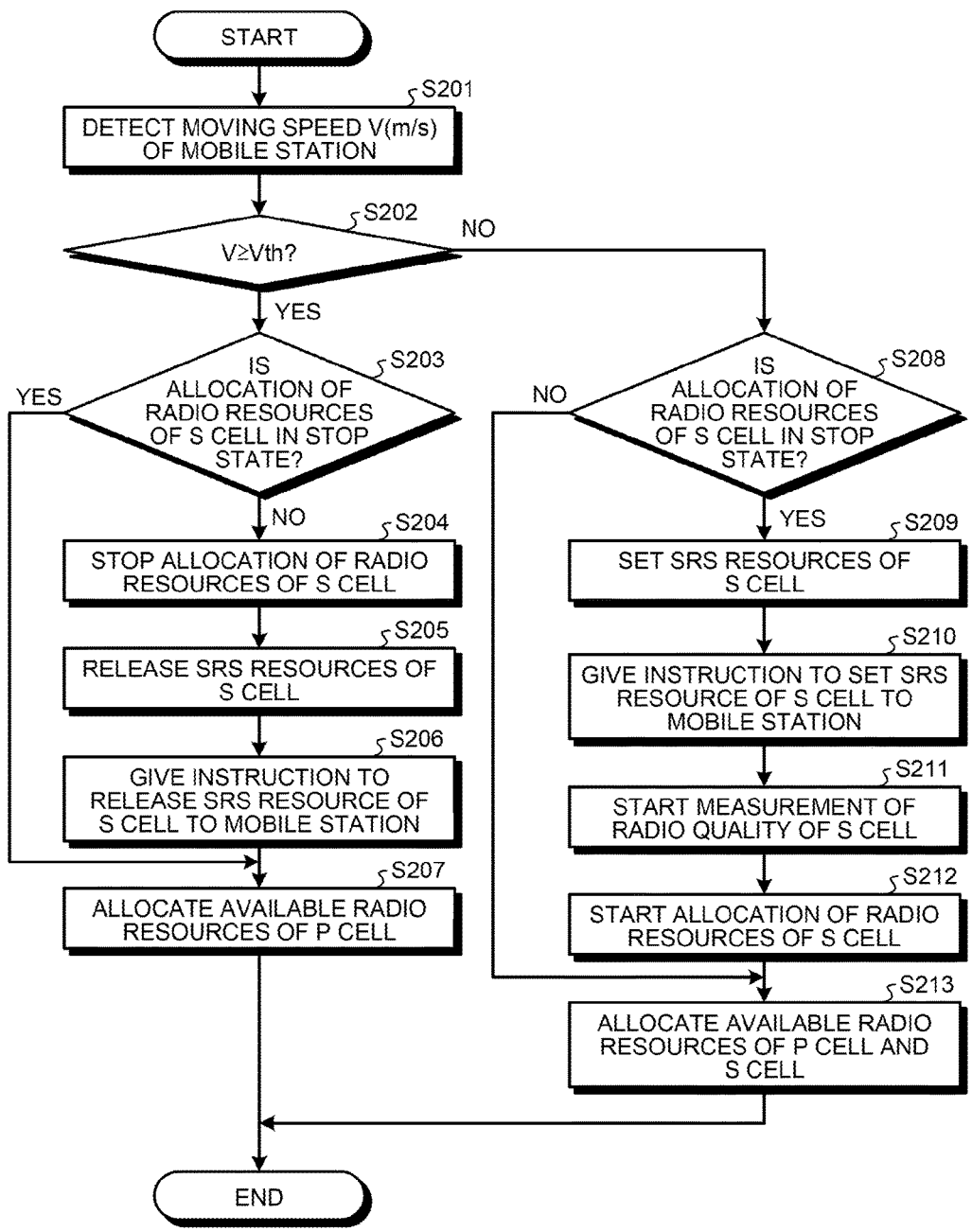
FIG. 9 is a flowchart of a process of allocating radio resources of an S cell by a wireless base station according to a second embodiment.

Next, the flow of the process of allocating the radio resources of the S cell by the wireless base station 1 according to the present embodiment will be described with reference to FIG. 9. FIG. 9 is a flowchart of the process of allocating the radio resources of the S cell by the wireless base station according to the second embodiment.

The moving speed measuring unit 50 calculates the moving speed V(m/s) of the mobile station 3 using the pilot signal acquired from the pilot signal demodulating unit 125 of the P cell communication unit 10 (Step S201).

The scheduling processing unit 30 receives an input of the moving speed V(m/s) from the moving speed measuring unit 50. Then, the scheduling processing unit 30 determines whether or not the moving speed V is equal to or more than the moving speed threshold value Vth (Step S202). When V≥Vth (Yes in Step S202), the scheduling processing unit 30 determines whether or not the allocation of the radio resources of the S cell is in a stop state (Step S203).

When the allocation of the radio resources of the S cell is in the stop state (Yes in Step S203), the scheduling processing unit 30 proceeds to Step S207.

On the other hand, when the allocation of the radio resources of the S cell is not in the stop state (No in Step S203), the scheduling processing unit 30 stops the allocation of the radio resources of the S cell to the mobile station 3 in which V≥Vth is satisfied (Step S204).

Further, the scheduling processing unit 30 releases the SRS resources of the S cell for the mobile station 3 in which V≥Vth is satisfied (Step S205).

Further, the scheduling processing unit 30 instructs the RRC processing unit 40 to give a SRS resources release notification of an S cell. The RRC processing unit 40 transmits the RRC message for releasing the SRS resources of the S cell to the mobile station 3 in which V≥Vth is satisfied (Step S206).

Then, the scheduling processing unit 30 performs the allocation of the available radio resources of the P cell, and establishes communication with the mobile station 3 in which V≥Vth is satisfied (Step S207).

Alternatively, when V<Vth (No in Step S202), the scheduling processing unit 30 determines whether or not the allocation of the radio resources of the S cell is in the stop state (Step S208). When the allocation of the radio resources of the S cell is not in the stop state (No in Step S208), the scheduling processing unit 30 proceeds to Step S213.

On the other hand, when the allocation of the radio resources of the S cell is in the stop state (Yes in Step S208), the scheduling processing unit 30 sets the SRS resources of the S cell to the mobile station 3 in which V<Vth is satisfied (Step S209).

Further, the scheduling processing unit 30 instructs the RRC processing unit 40 to give a SRS resource setting notification of an S cell. The RRC processing unit 40 transmits the RRC message for setting the SRS resources of the S cell to the mobile station 3 in which V<Vth is satisfied (Step S210).

Further, the scheduling processing unit 30 instructs the radio quality measuring unit 226 to start the measurement of the radio quality. The radio quality measuring unit 226 starts the measurement of the radio quality of the S cell of the mobile station 3 in which V<Vth is satisfied (Step S211).

Further, the scheduling processing unit 30 starts the allocation of the radio resources of the S cell to the mobile station 3 in which V<Vth is satisfied (Step S212).

Then, the scheduling processing unit 30 performs the allocation of the available radio resources of the P cell and the S cell, and establishes communication with the mobile station 3 in which V<Vth is satisfied (Step S213).

Figure 10:
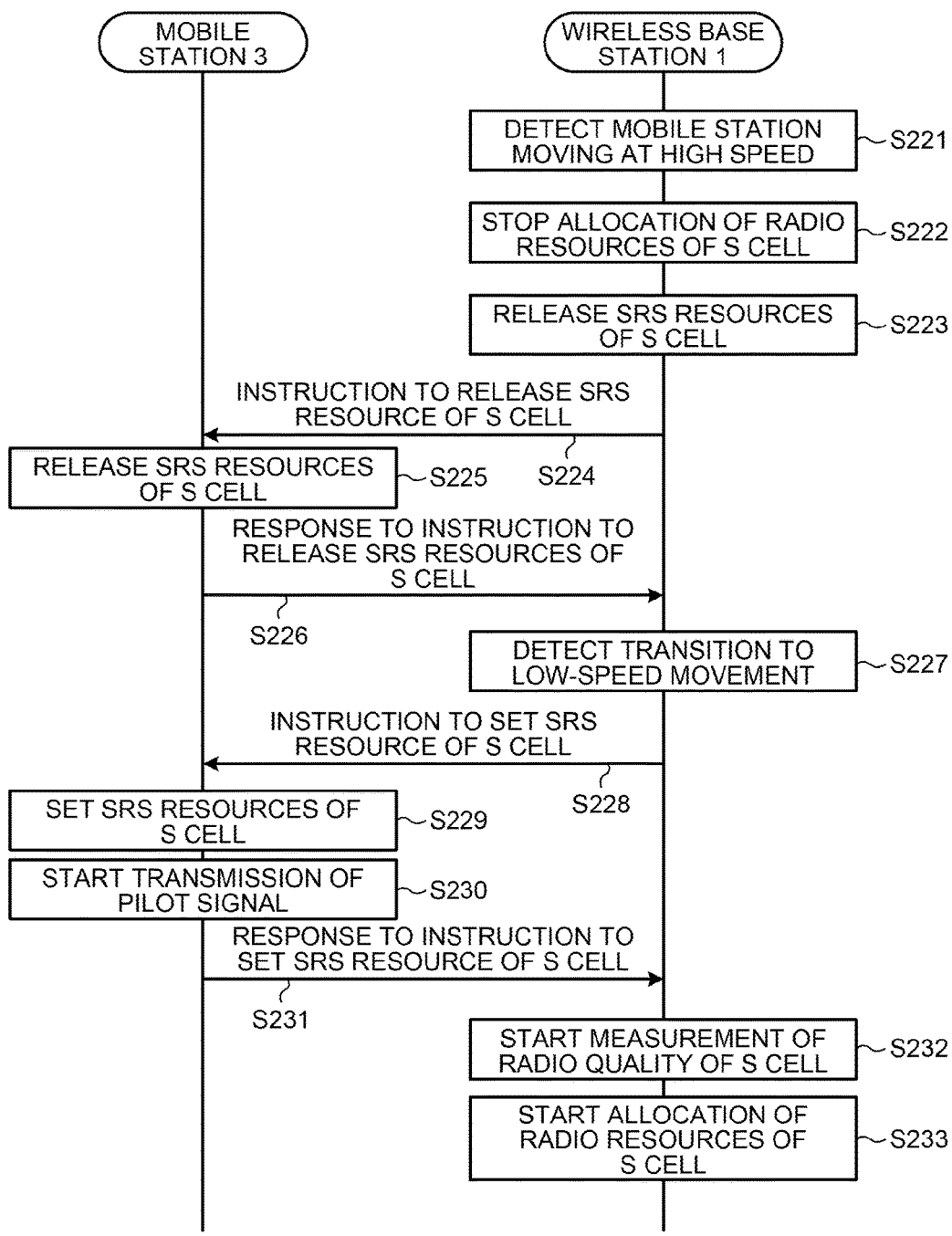
FIG. 10 is a sequence diagram of a process of allocating radio resources of an S cell between the wireless base station and a mobile station according to the second embodiment.

Next, the flow of the process of allocating the radio resource of the S cell between the wireless base station 1 and the mobile station 3 according to the present embodiment will be described with reference to FIG. 10. FIG. 10 is a sequence diagram of the process of allocating the radio resources of the S cell between the wireless base station and the mobile station according to the second embodiment.

The scheduling processing unit 30 of the wireless base station 1 compares the moving speed of the mobile station 3 with the moving speed threshold value, and detects the mobile station 3 that is moving at a high speed (Step S221).

Then, the scheduling processing unit 30 of the wireless base station 1 stops the allocation of the radio resources of the S cell to the detected mobile station 3 (Step S222).

Further, the scheduling processing unit 30 of the wireless base station 1 releases the SRS resources of the S cell set to the detected mobile station 3 (Step S223). As a result, the radio quality measuring unit 226 of the wireless base station 1 stops the measurement of the radio quality of the S cell for the detected mobile station 3.

Further, the RRC processing unit 40 of the wireless base station 1 transmits the RRC message to instruct the release of the SRS resources of the S cell to the detected mobile station 3 (Step S224).

The control unit 303 of the mobile station 3 receives the RRC message for releasing the SRS resources of the S cell. Then, the control unit 303 releases the SRS resources of the S cell, and stops the transmission of the pilot signal such as the SRS (Step S225).

Then, the control unit 303 of the mobile station 3 transmits, to the wireless base station 1, a response to the instruction to release SRS resource of the S cell (Step S226).

Thereafter, the scheduling processing unit 30 of the wireless base station 1 compares the moving speed of the mobile station 3 with the moving speed threshold value, and detects that the mobile station 3 in a high speed movement has transitioned to a low-speed movement state (Step S227).

Then, the RRC processing unit 40 of the wireless base station 1 transmits the RRC message to instruct the setting of the SRS resources of the S cell to the detected mobile station 3 (Step S228).

The control unit 303 of the mobile station 3 receives the RRC message for setting the SRS resources of the S cell. Then, the control unit 303 sets the SRS resources of the S cell (Step S229).

Then, the control unit 303 starts the transmission of the pilot signal such as the SRS (Step S230).

Thereafter, the control unit 303 of the mobile station 3 transmits, to the wireless base station 1, a response to the instruction to set SRS resource of the S cell (Step S231).

The radio quality measuring unit 226 of the wireless base station 1 starts the measurement of the radio quality of the S cell of the detected mobile station 3 (Step S232).

The scheduling processing unit 30 of the wireless base station 1 starts the allocation of the radio resources of the S cell to the detected mobile station 3 (Step S233).

As described above, when the wireless environment of the mobile station gets worse, the wireless base station according to the present embodiment releases the SRS resources of the S cell. The rage of the SRS resources is often limited according to the processing performance of the wireless base station. For this reason, when there are a number of mobile stations within the wireless base station, the SRS resources that can be accommodated in the wireless base station are likely to be depleted. Thus, the wireless base station according to the present embodiment can use the radio resources of the S cell more effectively than in the first embodiment, leading to a higher possibility that the depletion of the SRS resource will be prevented.

Third Embodiment

Next, a third embodiment will be described. The wireless base station according to the present embodiment differs from that of the first embodiment in that a radio link of the S cell is released. The wireless base station according to the present embodiment has the same configuration as that illustrated in FIG. 3. In the following, a description of functions of the same units as those in the first embodiment will not be repeated.

When the scheduling processing unit 30 determines that the moving speed of the mobile station 3 acquired from the moving speed measuring unit 50 is equal to or more than the moving speed threshold value, the scheduling processing unit 30 stops the allocation of the radio resources of the S cell to the mobile station 3.

Further, the scheduling processing unit 30 releases the radio link with the S cell set to the mobile station 3 whose moving speed is equal to or more than the moving speed threshold value. Specifically, the scheduling processing unit 30 stores information on whether or not the radio link of the S cell is set to each mobile station 3. Then, the scheduling processing unit 30 registers information indicating that the radio link with the S cell is not set to the mobile station 3 whose moving speed is equal to or more than the moving speed threshold value. As a result, the scheduling processing unit 30 stops the measurement of the radio quality by the radio quality measuring unit 226. Then, the scheduling processing unit 30 releases the radio link with the S cell, and thus can set the released radio link with the S cell to another mobile station 3.

Further, the scheduling processing unit 30 instructs the RRC processing unit 40 to give a notification for releasing the radio link with the S cell.

Thereafter, when the moving speed of the mobile station 3 is less than the moving speed threshold value, the scheduling processing unit 30 sets the radio link with the S cell to the mobile station 3.

Further, the scheduling processing unit 30 instructs the RRC processing unit 40 to give a notification for setting the radio link with the S cell.

Further, the scheduling processing unit 30 notifies the radio quality measuring unit 226 of the start of the measurement of the radio quality of the S cell of the mobile station 3 whose moving speed is less than the moving speed threshold value.

Then, the scheduling processing unit 30 resumes the allocation of the radio resources of the S cell to the mobile station 3 whose moving speed is less than the moving speed threshold value.

When the allocation of the radio resources to the mobile station 3 is stopped, the RRC processing unit 40 receives, from the scheduling processing unit 30, the notification for releasing the radio link with the S cell. Then, the RRC processing unit 40 generates the RRC message for releasing the radio link with the S cell from the mobile station 3 whose moving speed is less than the moving speed threshold value. Then, the RRC processing unit 40 transmits the generated RRC message to the mobile station 3 through the S1/X2 interface processing unit 60, the downlink MAC processing unit 117, the transmitting unit 11, the D/A converting unit 13, the transmitting RF unit 151, and the antenna 16.

Thereafter, when the allocation of the radio resources to the mobile station 3 is resumed, the RRC processing unit 40 receives the notification for setting the radio link with the S cell from the scheduling processing unit 30. Then, the RRC processing unit 40 generates the RRC message for setting the radio link with the S cell to the mobile station 3 whose moving speed is less than the moving speed threshold value. Then, the RRC processing unit 40 transmits the generated RRC message to the mobile station 3 through the S1/X2 interface processing unit 60, the downlink MAC processing unit 117, the transmitting unit 11, the D/A converting unit 13, the transmitting RF unit 151, and the antenna 16.

Here, the RRC processing unit 40 uses the sCellToReleasList and the sCellTlSddModList in RRCConnectionReconfiguration specified in TS36.331 as the notifications for setting and releasing the radio link with the S cell.

When the scheduling processing unit 30 releases the radio link between the S cell and the mobile station 3, the radio quality measuring unit 226 does not receive the pilot signal such as the SRS, and stops the measurement of the radio quality.

Thereafter, when the allocation of the radio resources to the mobile station 3 is resumed, the radio quality measuring unit 226 receives an instruction to measure the radio quality of the S cell of the mobile station 3 from the scheduling processing unit 30. Upon receiving the instruction, the radio quality measuring unit 226 resumes the measurement of the radio quality of the S cell of the mobile station 3.

The control unit 303 of the mobile station 3 receives the RRC message for releasing the radio link with the S cell through the antenna 304 and the S cell communication unit 302. Then, the control unit 303 releases the radio link with the S cell.

Thereafter, when the allocation of the radio resources to the mobile station 3 is resumed, the control unit 303 of the mobile station 3 receives the RRC message for setting the radio link with the S cell through the antenna 304 and the S cell communication unit 302. Then, the control unit 303 resumes the radio link with the S cell.

Figure 11:
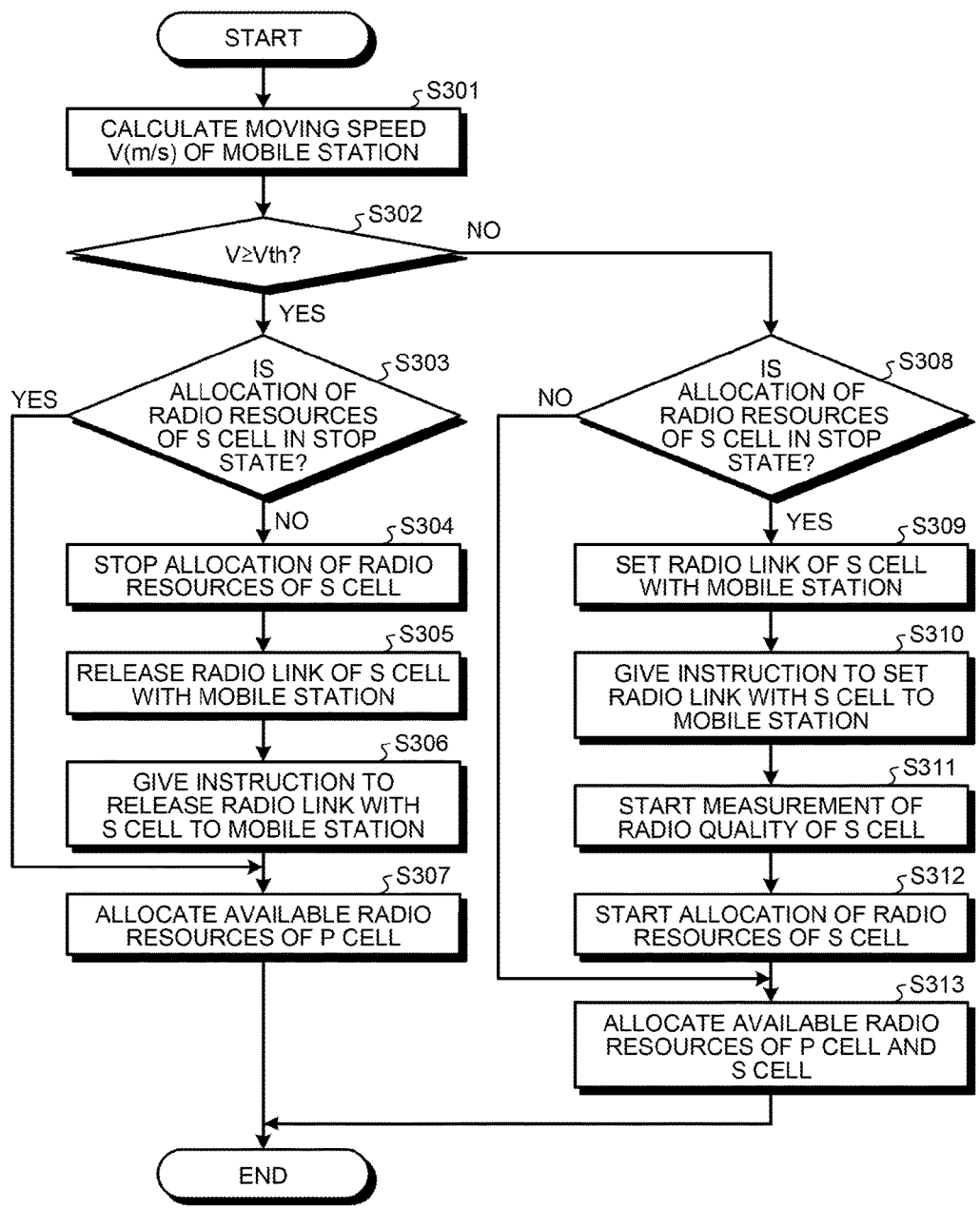
FIG. 11 is a flowchart of a process of allocating radio resources of an S cell by a wireless base station according to a third embodiment.

Next, the flow of the process of allocating the radio resources of the S cell by the wireless base station 1 according to the present embodiment will be described with reference to FIG. 11. FIG. 11 is a flowchart of the process of allocating the radio resources of the S cell by the wireless base station according to the third embodiment.

The moving speed measuring unit 50 calculates the moving speed V(m/s) of the mobile station 3 using the pilot signal acquired from the pilot signal demodulating unit 125 of the P cell communication unit 10 (Step S301).

The scheduling processing unit 30 receives an input of the moving speed V(m/s) from the moving speed measuring unit 50. Then, the scheduling processing unit 30 determines whether or not the moving speed V is equal to or more than the moving speed threshold value Vth (Step S302). When V≥Vth (Yes in Step S302), the scheduling processing unit 30 determines whether or not the allocation of the radio resources of the S cell is in a stop state (Step S303).

When the allocation of the radio resources of the S cell is in the stop state (Yes in Step S303), the scheduling processing unit 30 proceeds to Step S307.

On the other hand, when the allocation of the radio resources of the S cell is not in the stop state (No in Step S303), the scheduling processing unit 30 stops the allocation of the radio resources of the S cell to the mobile station 3 in which V≥Vth is satisfied (Step S304).

Further, the scheduling processing unit 30 releases the radio link with the S cell from the mobile station 3 in which V≥Vth is satisfied (Step S305).

Further, the scheduling processing unit 30 instructs the RRC processing unit 40 to give the notification for releasing the radio link with the S cell. The RRC processing unit 40 transmits the RRC message for releasing the radio link with the S cell to the mobile station 3 in which V≥Vth is satisfied (Step S306).

Then, the scheduling processing unit 30 performs the allocation of the available radio resources of the P cell, and establishes communication with the mobile station 3 in which V≥Vth is satisfied (Step S307).

On the other hand, when V<Vth (No in Step S302), the scheduling processing unit 30 determines whether or not the allocation of the radio resources of the S cell is in the stop state (Step S308). When the allocation of the radio resources of the S cell is not in the stop state (No in Step S308), the scheduling processing unit 30 proceeds to Step S313.

On the other hand, when the allocation of the radio resources of the S cell is in the stop state (Yes in Step S308), the scheduling processing unit 30 sets the radio link with the S cell to the mobile station 3 in which V<Vth is satisfied (Step S309).

Further, the scheduling processing unit 30 instructs the RRC processing unit 40 to give the notification for setting the radio link with the S cell. The RRC processing unit 40 transmits the RRC message for setting the radio link with the S cell to the mobile station 3 in which V<Vth is satisfied (Step S310).

Further, the scheduling processing unit 30 instructs the radio quality measuring unit 226 to start the measurement of the radio quality. The radio quality measuring unit 226 starts the measurement of the radio quality of the S cell of the mobile station 3 in which V<Vth is satisfied (Step S311).

Further, the scheduling processing unit 30 starts the allocation of the radio resources of the S cell to the mobile station 3 in which V<Vth is satisfied (Step S312).

Then, the scheduling processing unit 30 performs the allocation of the available radio resources of the P cell and the S cell, and establishes communication with the mobile station 3 in which V<Vth is satisfied (Step S313).

Figure 12:
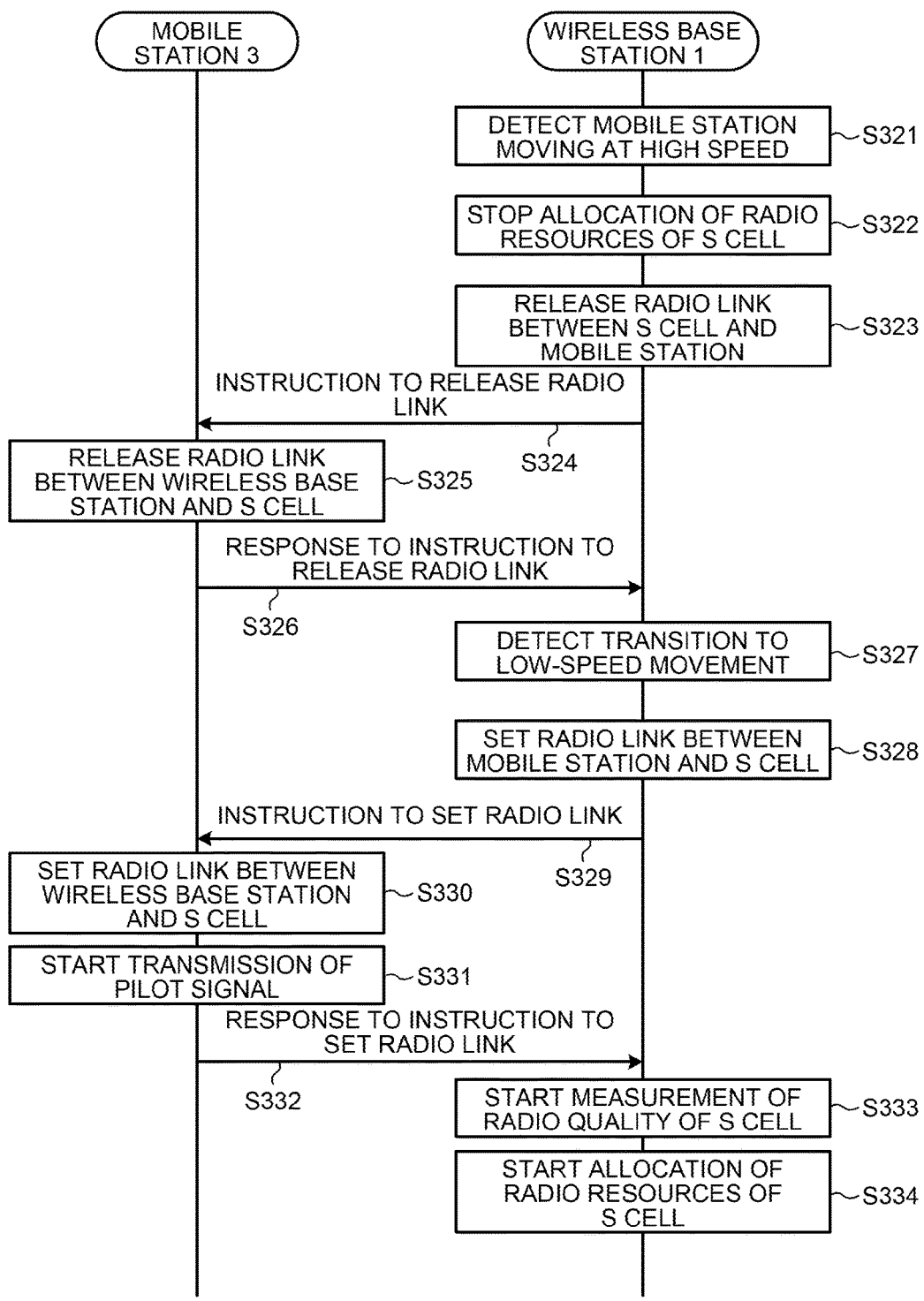
FIG. 12 is a sequence diagram of a process of allocating radio resources of an S cell between the wireless base station and a mobile station according to the third embodiment.

Next, the flow of the process of allocating the radio resource of the S cell between the wireless base station 1 and the mobile station 3 according to the present embodiment will be described with reference to FIG. 12. FIG. 12 is a sequence diagram of the process of allocating the radio resource of the S cell between the wireless base station and the mobile station according to the third embodiment.

The scheduling processing unit 30 of the wireless base station 1 compares the moving speed of the mobile station 3 with the moving speed threshold value, and detects the mobile station 3 that is moving at a high speed (Step S321).

Then, the scheduling processing unit 30 of the wireless base station 1 stops the allocation of the radio resources of the S cell to the detected mobile station 3 (Step S322).

Further, the scheduling processing unit 30 of the wireless base station 1 releases the radio link with the S cell set to the detected mobile station 3 (Step S323). As a result, the radio quality measuring unit 226 of the wireless base station 1 stops the measurement of the radio quality of the S cell for the detected mobile station 3.

Further, the RRC processing unit 40 of the wireless base station 1 transmits, to the detected mobile station 3, the RRC message to instruct the release of the radio link with the S cell (Step S324).

The control unit 303 of the mobile station 3 receives the RRC message for releasing the radio link with the S cell. Then, the control unit 303 releases the radio link with the S cell (Step S325).

Then, the control unit 303 of the mobile station 3 transmits, to the wireless base station 1, a response to the instruction to release the radio link with the S cell (Step S326).

Thereafter, the scheduling processing unit 30 of the wireless base station 1 compares the moving speed of the mobile station 3 with the moving speed threshold value, and detects that the mobile station 3 in a high speed movement has transitioned to a low-speed movement state (Step S327).

Further, the scheduling processing unit 30 of the wireless base station 1 sets the radio link with the S cell of the detected mobile station 3 (Step S328).

Then, the RRC processing unit 40 of the wireless base station 1 transmits the RRC message to instruct the setting of the radio link with the S cell to the detected mobile station 3 (Step S329).

The control unit 303 of the mobile station 3 receives the RRC message for setting the radio link with the S cell. Then, the control unit 303 sets the radio link with the S cell (Step S330).

Then, the control unit 303 starts the transmission of the pilot signal such as the SRS (Step S331).

Thereafter, the control unit 303 of the mobile station 3 transmits a response to the instruction to set the radio link with the S cell to the wireless base station 1 (Step S332).

The radio quality measuring unit 226 of the wireless base station 1 starts the measurement of the radio quality of the S cell of the detected mobile station 3 (Step S333).

The scheduling processing unit 30 of the wireless base station 1 starts the allocation of the radio resources of the S cell to the detected mobile station 3 (Step S334).

As described above, when the wireless environment of the mobile station has gotten worse, the wireless base station according to the present embodiment releases the radio link of the S cell with the mobile station. As a result, it is possible to effectively use the resources of the radio link of the S cell. For example, the wireless base station according to the present embodiment can release an ID of the mobile station used in the S cell, for example, a cell-radio network temporary identifier (C-RNTI). Here, the number of C-RNTI ranges is often limited according to a system condition of the wireless communication system. Since the number of mobile stations accommodated in the wireless base station is instantaneously increased, the number of C-RNTIs that can be used in the wireless base station is likely to be depleted. Thus, the wireless base station according to the present embodiment can effectively use the C-RNTI.

Fourth Embodiment

Figure 13:
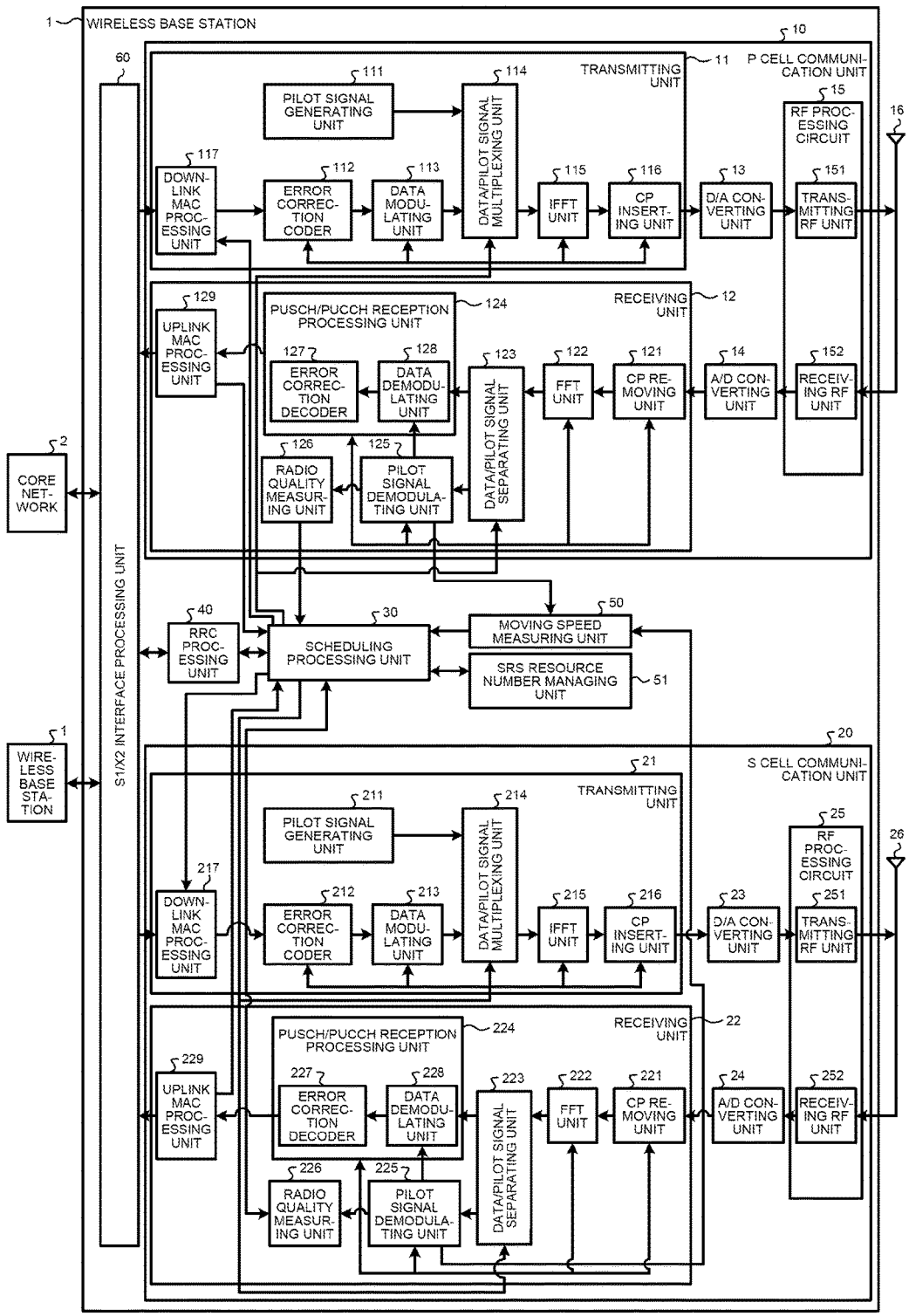
FIG. 13 is a block diagram of a wireless base station according to a fourth embodiment.

Next, a fourth embodiment will be described. The wireless base station according to the present embodiment differs from that of the first embodiment in that present embodiment includes a selection between the process going until the measurement of the radio quality is stopped as described in the first embodiment and the process going further until the SRS resources of the S cell is released as described in the second embodiment. FIG. 13 is a block diagram of a wireless base station according to the fourth embodiment. The wireless base station 1 according to the present embodiment further includes an SRS resource number managing unit 51 in addition to the respective units of the first embodiment. In the following, a description of functions of the same units as those in the first embodiment will not be repeated. Hereinafter, an operation mode, in which only the stop of the measurement of the radio quality is performed as described in the first embodiment is performed, is referred to as a "radio quality measurement stop mode". Alternatively, an operation mode, in which the release of the SRS resources of the S cell is performed as described in the second embodiment, is referred to as an "SRS resource release mode".

The SRS resource number managing unit 51 stores an SRS resource number threshold value used to determine switching of the operation mode for each S cell. Further, the SRS resource number managing unit 51 receives, from the scheduling processing unit 30, the number of SRS resources accommodated in the S cell used by the mobile station 3 whose moving speed is equal to or more than the moving speed threshold value.

Then, when the received SRS resource number is equal to or more than the SRS resource number threshold value, the SRS resource number managing unit 51 notifies the scheduling processing unit 30 of selection of the SRS resource release mode.

Alternatively, when the received SRS resource number is less than the SRS resource number threshold value, the SRS resource number managing unit 51 notifies the scheduling processing unit 30 of selection of the radio quality measurement stop mode.

When the allocation of the radio resources of the S cell is determined to be stopped, the scheduling processing unit 30 notifies the SRS resource number managing unit 51 of the number of SRS resources accommodated in the S cell used by the mobile station 3 whose moving speed is equal to or more than the moving speed threshold value. Thereafter, the scheduling processing unit 30 receives a notification of the mode to be selected from the SRS resource number managing unit 51.

When the selection of the radio quality measurement stop mode is instructed, the scheduling processing unit 30 performs the process described in the first embodiment. In other words, the scheduling processing unit 30 stops the allocation of the radio resources to the mobile station 3 whose moving speed is equal to or more than the moving speed threshold value, and stops the measurement of the radio quality of the S cell by the radio quality measuring unit 226. Thereafter, when the moving speed of the mobile station 3 is less than the moving speed threshold value, the scheduling processing unit 30 resumes the measurement of the radio quality of the S cell of the mobile station 3 by the radio quality measuring unit 226, and resumes the allocation of the radio resources.

On the other hand, when the selection of the SRS resource release mode is instructed, the scheduling processing unit 30 performs the process described in the second embodiment. In other words, the scheduling processing unit 30 stops the allocation of the radio resources to the mobile station 3 whose moving speed is equal to or more than the moving speed threshold value, and releases the SRS resources of the S cell. Thereafter, when the moving speed of the mobile station 3 is less than the moving speed threshold value, the scheduling processing unit 30 sets the SRS resources of the S cell to the mobile station 3, and resumes the allocation of the radio resources.

Figure 14:
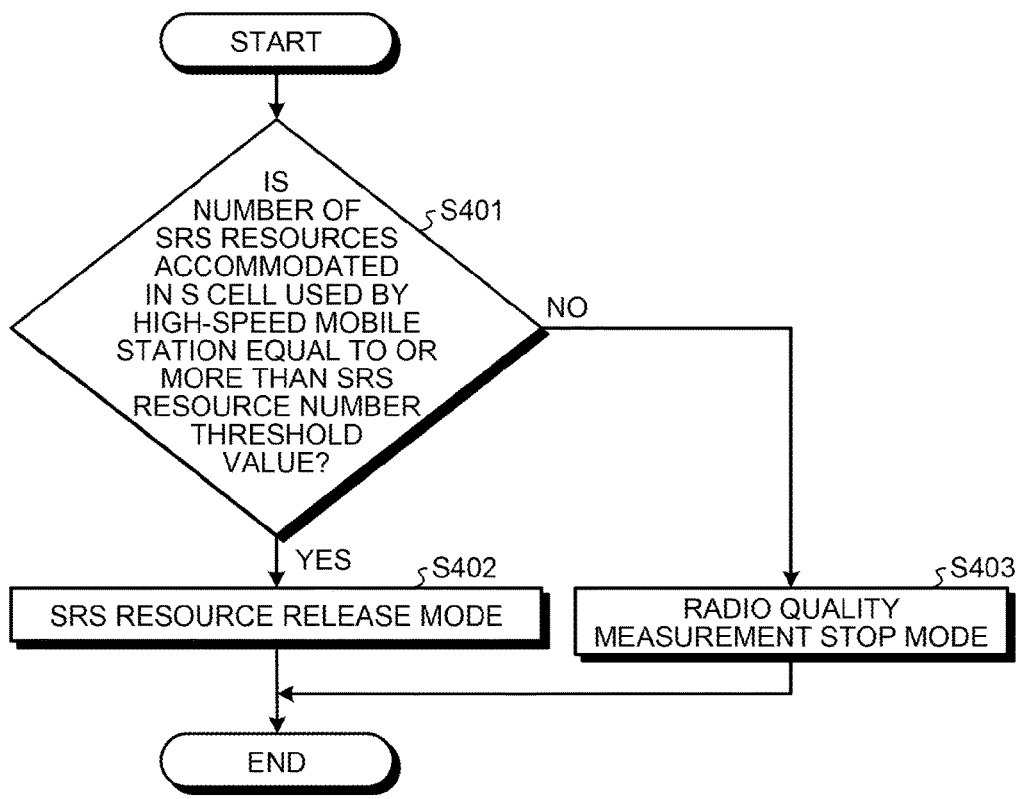
FIG. 14 is a flowchart of operation mode selection by the wireless base station according to the fourth embodiment.

Next, the selection of the operation mode by the wireless base station 1 according to the present embodiment will be described with reference to FIG. 14. FIG. 14 is a flowchart of the selection of the operation mode by the wireless base station according to the fourth embodiment.

The SRS resource number managing unit 51 receives, from the scheduling processing unit 30, the number of SRS resources accommodated in the S cell used by the high-speed mobile station serving as the mobile station 3 whose moving speed is equal to or more than the moving speed threshold value. Then, the SRS resource number managing unit 51 determines whether or not the acquired number of SRS resources is equal to or more than the SRS resource number threshold value (Step S401).

When the number of SRS resources is equal to or more than the SRS resource number threshold value (Yes in Step S401), the SRS resource number managing unit 51 notifies the scheduling processing unit 30 of the selection of the SRS resource release mode. Then, the scheduling processing unit 30 operates in the SRS resource release mode (Step S402).

On the other hand, when the number of SRS resources is less than the SRS resource number threshold value (No in Step S401), the SRS resource number managing unit 51 notifies the scheduling processing unit 30 of the selection of the radio quality measurement stop mode. Then, the scheduling processing unit 30 operates in the radio quality measurement stop mode (Step S403).

As described above, the wireless base station according to the present embodiment selects either the SRS resource release mode or the radio quality measurement stop mode as the operation mode, according to the number of SRS resources accommodated in the S cell used by the high-speed mobile station. As a result, when the number of SRS resources is likely to be depleted, it is possible to effectively use the SRS resources. When there are enough SRS resources, it is possible to stop and resume the allocation of the radio resources of the S cell rapidly.

Fifth Embodiment

Figure 15:
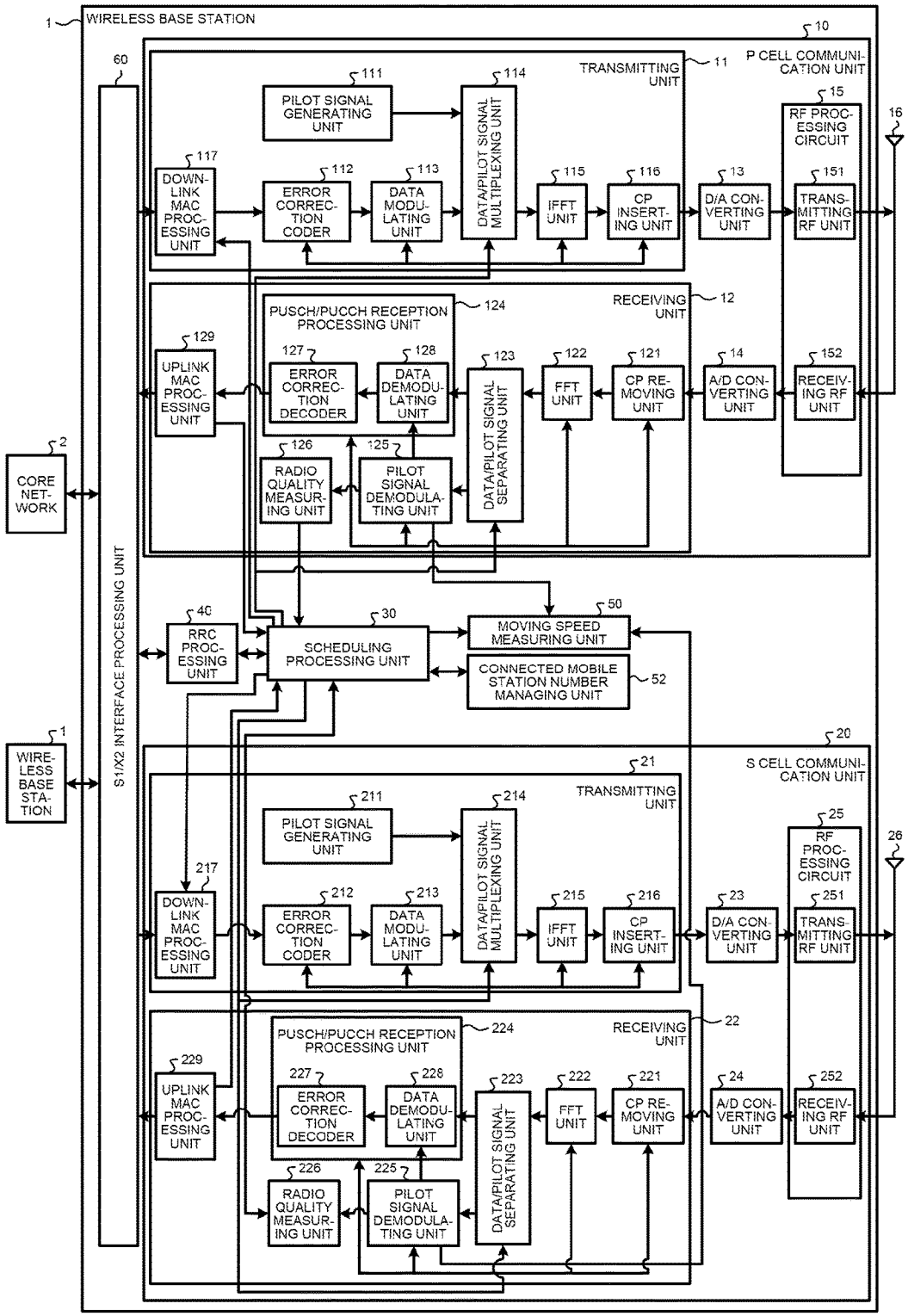
FIG. 15 is a block diagram of a wireless base station according to a fifth embodiment.

Next, a fifth embodiment will be described. The wireless base station according to the present embodiment differs from that of the first embodiment in that the present embodiment includes a selection between the process going until the measurement of the radio quality is stopped as described in the first embodiment and the process going further until the radio link of the S cell is released as described in the third embodiment. FIG. 15 is a block diagram of a wireless base station according to the fifth embodiment. The wireless base station 1 according to the present embodiment further includes a connected mobile station number managing unit 52 in addition to the respective units of the first embodiment. In the following, a description of functions of the same units as those in the first embodiment will not be repeated. Hereinafter, an operation mode, in which the radio link of the S cell is released as described in the third embodiment, is referred to as a "radio link release mode".

The connected mobile station number managing unit 52 stores a mobile station number threshold value used to determine switching of the operation mode for each S cell. The connected mobile station number managing unit 52 receives, from the scheduling processing unit 30, the number of mobile stations connected to the S cell used by the mobile station 3 whose moving speed is equal to or more than the moving speed threshold value.

The connected mobile station number managing unit 52 notifies the scheduling processing unit 30 of selection of the radio link release mode when the number of mobile stations received is equal to or more than the connected mobile station number threshold value.

Further, when the number of mobile stations received is less than the connected mobile station number threshold value, the connected mobile station number managing unit 52 notifies the scheduling processing unit 30 of the selection of the radio quality measurement stop mode.

When the allocation of the radio resources of the S cell is determined to be stopped, the scheduling processing unit 30 notifies the connected mobile station number managing unit 52 of the number of connected mobile stations connected to the S cell used by the mobile station 3 whose moving speed is equal to or more than the moving speed threshold value. Thereafter, the scheduling processing unit 30 receives the notification of the mode to be selected from the connected mobile station number managing unit 52.

When the selection of the radio quality measurement stop mode is instructed, the scheduling processing unit 30 performs the process described in the first embodiment. In other words, the scheduling processing unit 30 stops the allocation of the radio resources to the mobile station 3 whose moving speed is equal to or more than the moving speed threshold value, and stops the measurement of the radio quality of the S cell by the radio quality measuring unit 226. Thereafter, when the moving speed of the mobile station 3 is less than the moving speed threshold value, the scheduling processing unit 30 resumes the measurement of the radio quality of the S cell of the mobile station 3 by the radio quality measuring unit 226, and resumes the allocation of the radio resources.

On the other hand, when the selection of the radio link release mode is instructed, the scheduling processing unit 30 performs the process described in the third embodiment. In other words, the scheduling processing unit 30 stops the allocation of the radio resources to the mobile station 3 whose moving speed is equal to or more than the moving speed threshold value, and releases the radio link of the S cell. Thereafter, when the moving speed of the mobile station 3 is less than the moving speed threshold value, the scheduling processing unit 30 sets the radio link of the S cell to the mobile station 3, and resumes the allocation of the radio resources.

Figure 16:
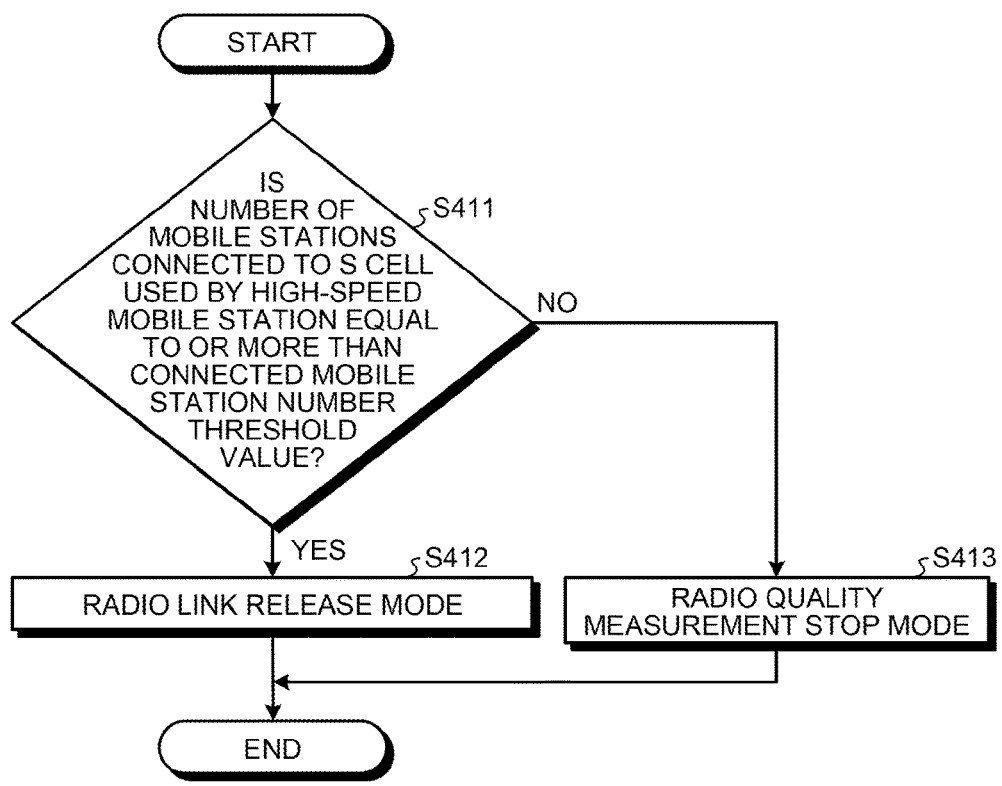
FIG. 16 is a flowchart of operation mode selection by the wireless base station according to the fifth embodiment.

Next, the selection of the operation mode by the wireless base station 1 according to the present embodiment will be described with reference to FIG. 16. FIG. 16 is a flowchart of the selection of the operation mode by the wireless base station according to the fifth embodiment.

The connected mobile station number managing unit 52 receives, from the scheduling processing unit 30, the number of mobile stations connected to the S cell used by the high-speed mobile station serving as the mobile station 3 whose moving speed is equal to or more than the moving speed threshold value. Then, the SRS resource number managing unit 51 determines whether or not the number of mobile stations acquired is equal to or more than the connected mobile station number threshold value (Step S411).

When the number of mobile stations is equal to or more than the connected mobile station number threshold value (Yes in Step S411), the connected mobile station number managing unit 52 notifies the scheduling processing unit 30 of the selection of the radio link release mode. Then, the scheduling processing unit 30 operates in the radio link release mode (Step S412).

On the other hand, when the number of mobile stations is less than the connected mobile station number threshold value (No in Step S411), the connected mobile station number managing unit 52 notifies the scheduling processing unit 30 of the selection of the radio quality measurement stop mode. Then, the scheduling processing unit 30 operates in the radio quality measurement stop mode (Step S413).

As described above, the wireless base station according to the present embodiment selects either the radio link release mode or the radio quality measurement stop mode as the operation mode, according to the number of mobile stations connected to the S cell used by the high-speed mobile station. As a result, for example, when the number of C-RNTIs is likely to be depleted, it is possible to increase the number of C-RNTIs. When there are enough SRS resources, it is possible to stop and resume the allocation of the radio resources of the S cell rapidly.

Sixth Embodiment

Figure 17:
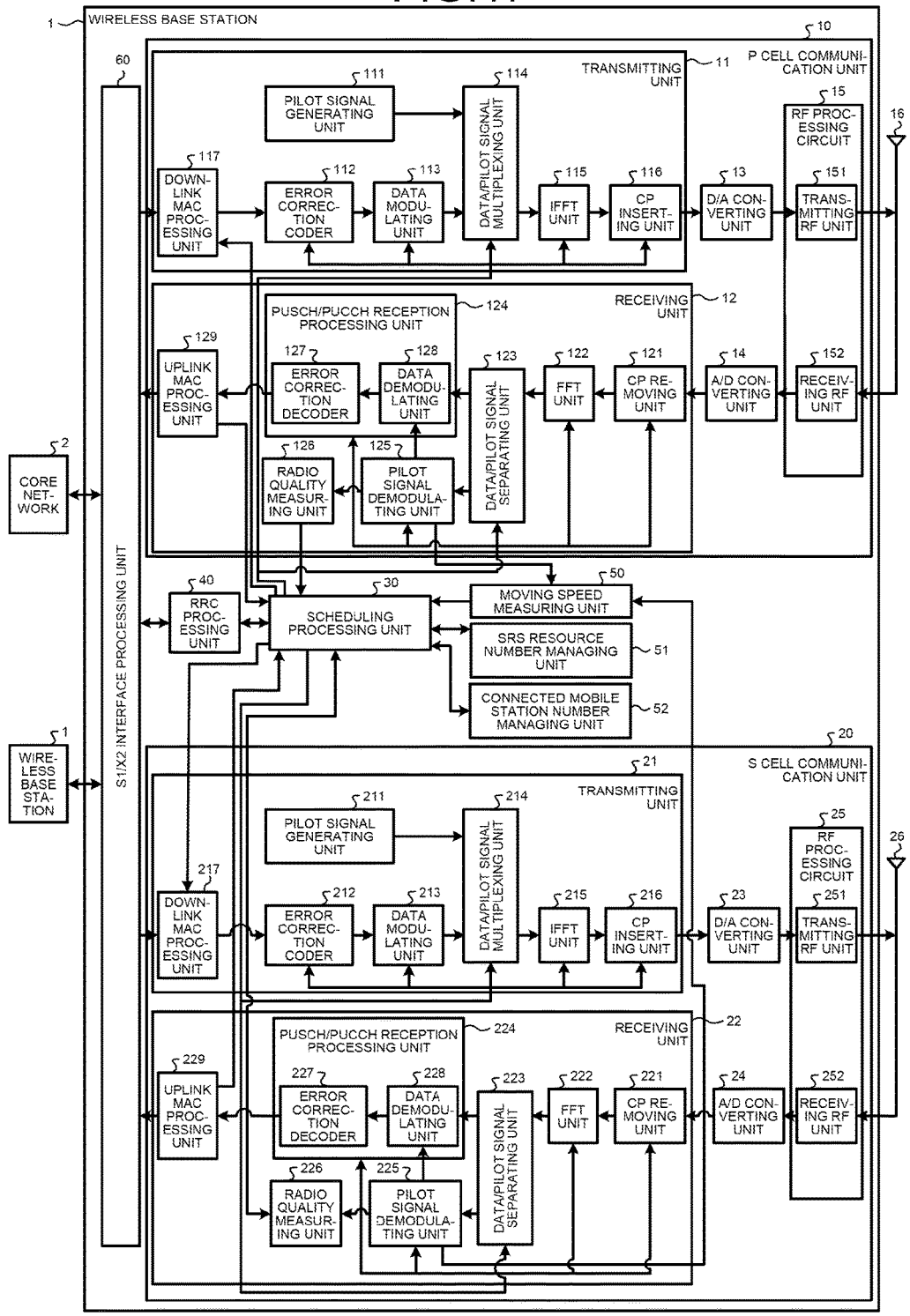
FIG. 17 is a block diagram of a wireless base station according to a sixth embodiment.

Next, a sixth embodiment will be described. The wireless base station according to the present embodiment differs from that of the first embodiment in that any one of the radio quality measurement stop mode, the SRS resource release mode, and the radio link release mode is selected as the operation mode. FIG. 17 is a block diagram of a wireless base station according to the sixth embodiment. The wireless base station 1 according to the present embodiment further includes the SRS resource number managing unit 51 and the connected mobile station number managing unit 52 in addition to the respective units of the first embodiment. In the following, a description of functions of the same units as those in the first embodiment will not be repeated.

The connected mobile station number managing unit 52 stores the mobile station number threshold value used to determine switching of the operation mode for each S cell, similarly to the third embodiment. Then, the connected mobile station number managing unit 52 receives, from the scheduling processing unit 30, the number of mobile stations connected to the S cell used by the mobile station 3 whose moving speed is equal to or more than the moving speed threshold value.

Further, when the number of mobile stations received is equal to or more than the connected mobile station number threshold value, the connected mobile station number managing unit 52 notifies the scheduling processing unit 30 of the selection of the radio link release mode.

Alternatively, when the number of mobile stations received is less than the connected mobile station number threshold value, the connected mobile station number managing unit 52 notifies the scheduling processing unit 30 of not selecting the radio link release mode.

The SRS resource number managing unit 51 stores the SRS resource number threshold value used to determine switching of the operation mode for each S cell, similarly to the second embodiment. Further, the SRS resource number managing unit 51 receives, from the scheduling processing unit 30, the number of SRS resources accommodated in the S cell used by the mobile station 3 whose moving speed is equal to or more than the moving speed threshold value.

Further, when the received SRS resource number is equal to or more than the SRS resource number threshold value, the SRS resource number managing unit 51 notifies the scheduling processing unit 30 of the selection of the SRS resource release mode.

Alternatively, when the received SRS resource number is less than the SRS resource number threshold value, the SRS resource number managing unit 51 notifies the scheduling processing unit 30 of the selection of the radio quality measurement stop mode.

When the allocation of the radio resources of the S cell is determined to be stopped, the scheduling processing unit 30 notifies the connected mobile station number managing unit 52 of the number of connected mobile stations connected to the S cell used by the mobile station 3 whose moving speed is equal to or more than the moving speed threshold value. Thereafter, the scheduling processing unit 30 receives the notification of the mode to be selected from the connected mobile station number managing unit 52.

When the connected mobile station number managing unit 52 gives an instruction to select the radio link release mode, the scheduling processing unit 30 performs the process described in the third embodiment. In other words, the scheduling processing unit 30 stops the allocation of the radio resources to the mobile station 3 whose moving speed is equal to or more than the moving speed threshold value, and releases the radio link of the S cell. Thereafter, when the moving speed of the mobile station 3 is less than the moving speed threshold value, the scheduling processing unit 30 sets the radio link of the S cell to the mobile station 3, and resumes the allocation of the radio resources.

On the other hand, the connected mobile station number managing unit 52 gives a notification indicating that the radio quality measurement stop mode is not selected, the scheduling processing unit 30 notifies the SRS resource number managing unit 51 of the number of SRS resources accommodated in the S cell used by the mobile station 3. Thereafter, the scheduling processing unit 30 receives the notification of the mode to be selected from the SRS resource number managing unit 51.

When the SRS resource number managing unit 51 gives an instruction to select the SRS resource release mode, the scheduling processing unit 30 performs the process described in the second embodiment. In other words, the scheduling processing unit 30 stops the allocation of the radio resources to the mobile station 3 whose moving speed is equal to or more than the moving speed threshold value, and releases the SRS resources of the S cell. Thereafter, when the moving speed of the mobile station 3 is less than the moving speed threshold value, the scheduling processing unit 30 sets the SRS resources of the S cell to the mobile station 3, and resumes the allocation of the radio resources.

On the other hand, when the SRS resource number managing unit 51 gives an instruction to select the radio quality measurement stop mode, the scheduling processing unit 30 performs the process described in the first embodiment. In other words, the scheduling processing unit 30 stops the allocation of the radio resources to the mobile station 3 whose moving speed is equal to or more than the moving speed threshold value, and stops the measurement of the radio quality of the S cell by the radio quality measuring unit 226. Thereafter, when the moving speed of the mobile station 3 is less than the moving speed threshold value, the scheduling processing unit 30 resumes the measurement of the radio quality of the S cell of the mobile station 3 by the radio quality measuring unit 226, and resumes the allocation of the radio resources.

Figure 18:
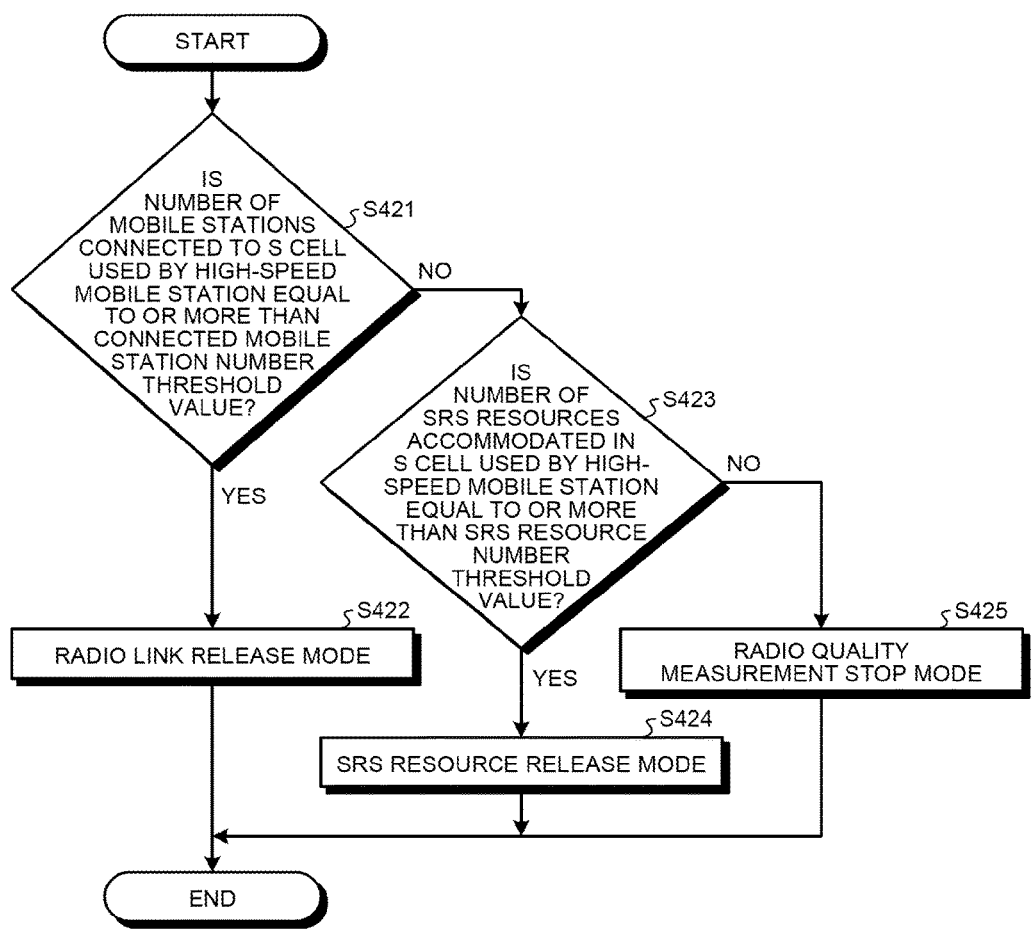
FIG. 18 is a flowchart of operation mode selection by the wireless base station according to the sixth embodiment.

Next, the selection of the operation mode by the wireless base station 1 according to the present embodiment will be described with reference to FIG. 18. FIG. 18 is a flowchart of the selection of the wireless base station according to the sixth embodiment.

The connected mobile station number managing unit 52 receives, from the scheduling processing unit 30, the number of mobile stations connected to the S cell used by the high-speed mobile station serving as the mobile station 3 whose moving speed is equal to or more than the moving speed threshold value. Then, the connected mobile station number managing unit 52 determines whether or not the number of mobile stations acquired is equal to or more than the connected mobile station number threshold value (Step S421).

When the number of mobile stations is equal to or more than the connected mobile station number threshold value (Yes in Step S421), the connected mobile station number managing unit 52 notifies the scheduling processing unit 30 of the selection of the radio link release mode. Then, the scheduling processing unit 30 operates in the radio link release mode (Step S422).

On the other hand, when the number of mobile stations is less than the connected mobile station number threshold value (No in Step S421), the SRS resource number managing unit 51 receives, from the scheduling processing unit 30, the number of SRS resources accommodated in the S cell used by the high-speed mobile station serving as the mobile station 3 whose moving speed is equal to or more than the moving speed threshold value. Then, the SRS resource number managing unit 51 determines whether or not the acquired number of SRS resources is equal to or more than the SRS resource number threshold value (Step S423).

When the number of SRS resources is equal to or more than the SRS resource number threshold value (Yes in Step S423), the SRS resource number managing unit 51 notifies the scheduling processing unit 30 of the selection of the SRS resource release mode. Then, the scheduling processing unit 30 operates in the SRS resource release mode (Step S424).

On the other hand, when the number of SRS resources is less than the SRS resource number threshold value (No in Step S423), the SRS resource number managing unit 51 notifies the scheduling processing unit 30 of the selection of the radio quality measurement stop mode. Then, the scheduling processing unit 30 operates in the radio quality measurement stop mode (Step S425).

As described above, the wireless base station according to the present embodiment selects any one of the radio quality measurement stop mode, the SRS resource release mode, and the radio link release mode as the operation mode. As a result, when the number of C-RNTIs is likely to be depleted, it is possible to increase the number of C-RNTIs. Further, when the number of SRS resources is likely to be depleted, it is possible to effectively use the SRS resources. When there are enough SRS resources, it is possible to stop and resume the allocation of the radio resources of the S cell rapidly.

According to one aspect of a base station device, a wireless communication system, and a base station device control method disclosed in the present application, an effect in that the processing load and the power consumption can be suppressed is obtained.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device, comprising:
a processor configured to:
establish communication with a wireless terminal device using a plurality of radio resources of a first cell and a second cell overlapping the first cell;
measure a moving speed of the wireless terminal device based on a signal that is transmitted from the wireless terminal device using the radio resources of the first cell; and
stop an allocation of the radio resources of the second cell to the wireless terminal device based on a wireless environment with the wireless terminal device, and start an allocation of the radio resources of the second cell to the wireless terminal device when the moving speed of the wireless terminal device is less than a certain value in a state in which the allocation of the radio resources of the second cell is stopped.

2. The base station device according to claim 1, wherein, when the wireless environment has gotten worse, the processor is configured to stop the allocation of the radio resources of the second cell.

3. The base station device according to claim 2, wherein, when the moving speed of the wireless terminal device is equal to or more than the certain value, the processor is configured to determine that the wireless environment has gotten worse.

4. The base station device according to claim 2, wherein, when a number of reception failures per unit time of the signal transmitted from the wireless terminal device using the radio resources of the second cell is equal to or more than a certain number of times, the processor is configured to determine that the wireless environment has gotten worse.

5. The base station device according to claim 1, wherein the processor is configured to
measure a radio quality using a certain signal transmitted from the wireless terminal device using the radio resources of the second cell,
stop the measuring of the radio quality and notifies the wireless terminal device of transmission stop of the certain signal when the allocation of the radio resources of the second cell to the wireless terminal device is stopped, and starts the measuring of the radio quality, and
notify the wireless terminal device of transmission start of the certain signal when the allocation of the radio resources of the second cell to the wireless terminal device is started.

6. The base station device according to claim 1, wherein the processor is configured to set the radio resources of the second cell serving as a target to be allocated to the wireless terminal device, perform an allocation from the set radio resources, release the setting of the radio resources when the allocation of the radio resources of the second cell to the wireless terminal device is stopped, and Gets set the radio resources of the second cell serving as an allocation target of the wireless terminal device when the allocation of the radio resources of the second cell to the wireless terminal device is started.

7. The base station device according to claim 6, wherein the processor is configured to
determine whether or not a number of radio resources used for a reception quality measurement signal being used in the second cell is equal to or more than a resource number threshold value, and
release the setting of the radio resources when the number of radio resources used for the reception quality measurement signal being used in the second cell is equal to or more than the resource number threshold value.

8. The base station device according to claim 1, wherein the processor is configured to establish a radio link between the wireless terminal device and the base station device, performs the allocation of the radio resources of the second cell to the wireless terminal device, release the radio link when the allocation of the radio resources of the second cell to the wireless terminal device is stopped, and set the radio link between the wireless terminal device and the base station device when the allocation of the radio resources of the second cell to the wireless terminal device is started.

9. The base station device according to claim 8, wherein, the processor is configured to
determine whether or not the number of wireless terminal devices connected to the second cell is equal to or more than a connection threshold value, and
release the radio link when the number of wireless terminal devices connected to the second cell is equal to or more than the connection threshold value.

10. The base station device according to claim 1, wherein the processor is configured to measure the moving speed based on a pilot signal.

11. The base station device according to claim 1, wherein processor is configured to measure the moving speed based on position information of the wireless terminal device.

12. A wireless communication system, comprising:
a base station device; and
a wireless terminal device,
wherein the base station device includes:
a processor configured to:
establish communication with the wireless terminal device using a plurality of radio resources of a first cell and a second cell overlapping the first cell;
measure a moving speed of the wireless terminal device based on a signal that is transmitted from the wireless terminal device using the radio resources of the first cell; and
stop an allocation of the radio resources of the second cell to the wireless terminal device based on a wireless environment with the wireless terminal device, and start an allocation of the radio resources of the second cell to the wireless terminal device when the moving speed of the wireless terminal device is less than a certain value in a state in which the allocation of the radio resources of the second cell is stopped.

13. A base station device control method, comprising:
establishing communication with a wireless terminal device using a plurality of radio resources of a first cell and a second cell overlapping the first cell;
stopping an allocation of the radio resources of the second cell to the wireless terminal device based on a wireless environment with the wireless terminal device;
measuring a moving speed of the wireless terminal device based on a signal transmitted from the wireless terminal device using the radio resources of the first cell; and
starting the allocation of the radio resources of the second cell to the wireless terminal device when the moving speed of the wireless terminal device is less than a certain value in a state in which the allocation of the radio resources of the second cell is stopped.

* * * * *